US012423196B1

(12) United States Patent
Rajgaria et al.

(10) Patent No.: US 12,423,196 B1
(45) Date of Patent: Sep. 23, 2025

(54) FAST DATABASE RECOVERY IN A MULTI-VOLUME DATABASE ENVIRONMENT VIA TRANSACTIONAL AWARENESS

(71) Applicant: Amazon Technologies, Inc., Seattle, WA (US)

(72) Inventors: Punit Rajgaria, Saratoga, CA (US); Ramesh Chander, Santa Clara, CA (US); Murali Brahmadesam, Tiruchirappalli (IN); Hemanth Satyanarayana, Santa Clara, CA (US); Aakash Ashwin Shah, Mississauga (CA); Omar Farhat, Toronto (CA); Michael Higgins Dowling, Aurora (CA)

(73) Assignee: Amazon Technologies, Inc., Seattle, WA (US)

( * ) Notice: Subject to any disclaimer, the term of this patent is extended or adjusted under 35 U.S.C. 154(b) by 331 days.

(21) Appl. No.: 17/865,931

(22) Filed: Jul. 15, 2022

Related U.S. Application Data

(63) Continuation-in-part of application No. 16/915,332, filed on Jun. 29, 2020, now Pat. No. 11,455,290.

(51) Int. Cl.
*G06F 11/14* (2006.01)
*G06F 11/20* (2006.01)

(52) U.S. Cl.
CPC ...... *G06F 11/1471* (2013.01); *G06F 11/1458* (2013.01); *G06F 11/2053* (2013.01); *G06F 2201/80* (2013.01)

(58) Field of Classification Search
CPC .. G06F 16/2358; G06F 16/128; G06F 16/162; G06F 16/1734; G06F 16/1865;
(Continued)

(56) References Cited

U.S. PATENT DOCUMENTS 7,840,595 B1    11/2010   Blitzer et al.
9,804,935 B1 *  10/2017   Holenstein .......... G06F 11/1469
(Continued)

OTHER PUBLICATIONS

Zamanian et al. "Rethinking Database High Availability with RDMA Networks", 2019, https://dspace.mit.edu/bitstream/handle/1721.1/132283/3342263.3342639.pdf?sequence=2&isAllowed=y (Year: 2019).*

(Continued)

*Primary Examiner* — Matthew J Ellis
(74) *Attorney, Agent, or Firm* — Nicholson De Vos Webster & Elliott LLP

(57) ABSTRACT

Techniques for fast database recovery in a multi-volume database environment via transactional awareness are described. In the event of a failure associated with a first volume storing database page data, the first volume can be restored to a point in time and transactional metadata from a second volume storing logical change data can be obtained for a limited number of transactions occurring at/after that point in time, as opposed to analyzing extremely large change log files. These transactions can be checked to ensure that they have all been persisted, and if not, change data for those transactions can be obtained from the second volume and used to replay these transactions on the restored first volume.

20 Claims, 18 Drawing Sheets

(58) Field of Classification Search
CPC ............. G06F 16/2282; G06F 16/2423; G06F 11/147; G06F 11/1458; G06F 11/2053; G06F 2201/80
See application file for complete search history.

(56) References Cited

U.S. PATENT DOCUMENTS

| | | | |
|---|---|---|---|
| 11,080,262 | B1 | 8/2021 | Levandoski et al. |
| 2002/0007363 | A1* | 1/2002 | Vaitzblit ............. G06F 11/1474 714/E11.131 |
| 2002/0073276 | A1 | 6/2002 | Howard et al. |
| 2008/0162590 | A1* | 7/2008 | Kundu ................. G06F 11/1662 |
| 2013/0042156 | A1 | 2/2013 | Srinivasan et al. |
| 2014/0258241 | A1 | 9/2014 | Chen et al. |
| 2014/0279931 | A1 | 9/2014 | Gupta et al. |
| 2015/0278270 | A1 | 10/2015 | Zhang |
| 2016/0070740 | A1* | 3/2016 | Vermeulen ............ G06F 16/273 707/703 |
| 2017/0308568 | A1 | 10/2017 | Laethem et al. |
| 2017/0351584 | A1* | 12/2017 | Griffith ............... G06F 16/2358 |
| 2018/0336229 | A1* | 11/2018 | Muehle ................. G06F 16/245 |
| 2019/0065542 | A1 | 2/2019 | Baker et al. |
| 2019/0179935 | A1* | 6/2019 | Allgeier .............. G06F 11/3006 |
| 2019/0332582 | A1* | 10/2019 | Kumar .................. G06F 16/254 |
| 2019/0373521 | A1 | 12/2019 | Crawford |
| 2020/0034459 | A1 | 1/2020 | Rabe et al. |
| 2020/0186355 | A1 | 6/2020 | Davies |
| 2020/0344132 | A1* | 10/2020 | Padmanabhan ....... H04L 9/0637 |
| 2021/0034573 | A1 | 2/2021 | Heng et al. |
| 2021/0319442 | A1* | 10/2021 | Chapiewski ....... G06Q 20/3223 |
| 2022/0078006 | A1 | 3/2022 | Krishnamurthy et al. |

OTHER PUBLICATIONS

Lars et al. 2014. Managing consistency anomalies in distributed integrated databases with relaxed ACID properties. ICUIMC '14. Association for Computing Machinery, New York, NY, USA, Article 30, 1-7. https://doi.org/10.1145/2557977.2557982 (Year: 2014).*

Non-Final Office Action, U.S. Appl. No. 16/915,332, Nov. 16, 2021, 15 pages.

Notice of Allowance, U.S. Appl. No. 16/915,332, May 13, 2022, 9 pages.

Unpublished U.S. Patent Application for Online Restore for Database Engines, U.S. Appl. No. 15/616,888, filed Jun. 7, 2017.

Non-Final Office Action, U.S. Appl. No. 17/865,914, Aug. 14, 2024, 26 pages.

Non-Final Office Action, U.S. Appl. No. 17/865,948, Aug. 27, 2024, 26 pages.

Advisory Action, U.S. Appl. No. 17/865,914, Mar. 21, 2025, 2 pages.

Final Office Action, U.S. Appl. No. 17/865,914, Jan. 10, 2025, 28 pages.

Notice of Allowance, U.S. Appl. No. 17/865,948, Feb. 21, 2025, 12 pages.

Pham et al. 2006, "Complex Fault-tolerant System Reliability Modeling", https://link.springer.com/content/pdf/10.1007/1-84628-295-0_11.pdf (Year: 2006).

Non-Final Office Action, U.S. Appl. No. 17/865,914, Apr. 24, 2025, 27 pages.

* cited by examiner

| CHANGE LOG TABLE 312 | | 402A-402M |
|---|---|---|
| LSN | 123456 | |
| DATABASE_NAME | ABC123.DATABASE1 | |
| TRANSACTIONID | 7200 | |
| SHARDSEQUENCENUMBER | 3 | |
| TIMESTAMP | 2020-01-03 21:59:69.10 | |
| EVENTTYPE | UPDATE_ROWS_EVENTV2 | |
| EVENTLENGTH | 505 | |
| EVENTFLAGS | LOG_EVENT_SUPPRESS_USE_F | |
| OFFSETINTRANSACTION | 14 | |
| CHANGEDATA | ... | |

| TRANSACTION TABLE 314 | | 404A-404N |
|---|---|---|
| TRANSACTIONID | 7200 | |
| SHARDSEQUENCENUMBER | 3 | |
| COMMITSEQUENCENUMBER: | 7234114782 | |
| COMMITSTATUS: | COMMITTED | |
| BEGINTRANSACTIONTIMESTAMP | 2020-01-03 21:54:64.30 | |
| ENDTRANSACTIONTIMESTAMP | 2020-01-03 22:04:39.13 | |
| SERVERID | TABLESERVER1234-35W | |
| BEGINLSN | 123455 | |
| ENDLSN | 126466 | |
| FILENAME | ZXCV23543WDD.LG | |
| FILEOFFSET | 14221 | |
| LISTOFSHARDS | 2,3,4 | |
| TOTALCHANGEDATALENGTH | 55 | |

*FIG. 4*

ABSTRACT# FAST DATABASE RECOVERY IN A MULTI-VOLUME DATABASE ENVIRONMENT VIA TRANSACTIONAL AWARENESS

CROSS-REFERENCE TO RELATED APPLICATIONS

This application is a continuation in part of U.S. application Ser. No. 16/915,332, filed Jun. 29, 2020, which is hereby incorporated by reference.

BACKGROUND

In modern distributed cloud services, resilience and scalability are increasingly achieved by decoupling compute from storage and by replicating storage across multiple nodes. Doing so lets the database operator handle operations such as replacing misbehaving or unreachable hosts, adding replicas, failing over from a writer to a replica, scaling the size of a database instance up or down, etc.

The I/O bottleneck faced by traditional database systems changes in this environment. As I/Os can be spread across many nodes and many disks in a multi-tenant fleet, the individual disks and nodes are no longer hot. Instead, the bottleneck moves to the network between the database processing layer requesting I/Os and the storage layer that performs these I/Os. Beyond the basic bottlenecks of packets per second (PPS) and bandwidth, there is amplification of traffic since a performant database will issue writes out to the storage fleet in parallel. The performance of the outlier storage node, disk, or network path can dominate response time.

BRIEF DESCRIPTION OF DRAWINGS

Various examples in accordance with the present disclosure will be described with reference to the drawings, in which:

FIG. 4 illustrates exemplary change log records and transaction records in a distributed relational database service utilizing split volume types for redo log records and change log records according to some examples.

DETAILED DESCRIPTION

The present disclosure relates to methods, apparatus, systems, and non-transitory computer-readable storage media for implementing a distributed database utilizing split volume types. According to some examples, different volumes are utilized by a single database engine for different purposes. For example, change log data (e.g., binary log (or "binlog") record data of MySQL, write ahead log (WAL) data segments of Postgres, and the like) representing comparatively "logical" type change information can be stored in a first set of volumes implemented by an efficient distributed storage, while redo log data records (e.g., InnoDB redo log file records) representing more "physical" type database changes can be stored in a separate set of volumes also backed by an efficient distributed storage environment. The use of such disparate volume types can provide significant benefits, including but not limited to improved retrieval of committed change data without intervention of a database engine, which eliminates bottlenecks in access and allows the database to scale, and improved failure recovery through reduced recovery times and reduced data losses.

Figure 1:
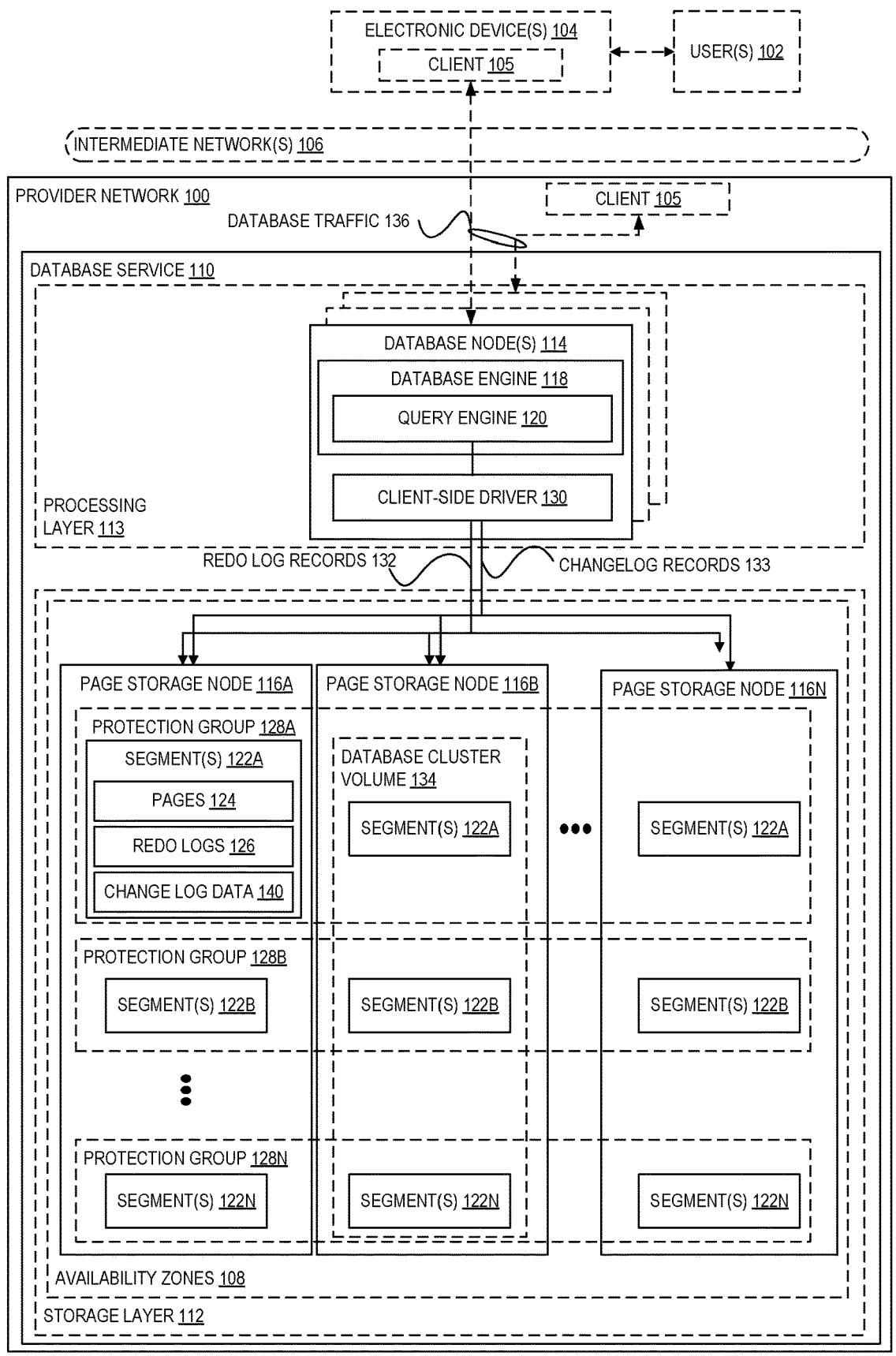
FIG. 1 illustrates an exemplary system including a distributed relational database service provided by a service provider network utilizing network-attached database cluster volumes for redo log record and change log record steams according to some examples.

FIG. 1 illustrates an exemplary system including a distributed relational database service provided by a service provider network utilizing split volumes for redo log record and change log record steams according to some examples.

A cloud provider network 100 (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users (e.g., users 102) may use electronic device(s) 104 to interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

A cloud provider network can be formed as a number of regions, where a region is a geographical area in which the cloud provider clusters data centers. Each region includes multiple (e.g., two or more) availability zones (AZs) (e.g., including availability zones 108) connected to one another via a private high-speed network, for example a fiber communication connection. An AZ provides an isolated failure domain including one or more data center facilities with separate power, separate networking, and separate cooling from those in another AZ. AZs within a region are positioned far enough away from one other that a same natural disaster (or other failure-inducing event) should not affect or take more than one AZ offline at the same time. Customers can connect to AZ of the cloud provider network via a publicly accessible network (e.g., the Internet, a cellular communication network).

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code-typically without the user having any control of or knowledge of the underlying compute instance(s) involved.

For example, in various examples, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some examples, a serverless function can be invoked through an API call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources may be maintained in a "ready" state (e.g., having a pre-initialized runtime environment configured to execute the serverless functions), allowing the serverless functions to be executed in near real-time.

The provider network 100 illustrated in FIG. 1 includes a database service 110, among any number of other services. According to some examples, the database service 110 enables clients 105 of users to create, manage, and use databases (e.g., relational databases) in a cloud-based environment in a manner that provides enhanced security, availability, and reliability relative to other database environments. In some examples, the database service 110 features a distributed, fault-tolerant, and self-healing storage system that automatically scales (e.g., implemented in part using a scalable storage layer 112). In some examples, a database system provided by a database service 110 organizes the basic operations of a database (e.g., query processing, transaction management, caching, and storage) into multiple tiers or layers that can be individually and independently scalable. For example, in some examples, each database instance provided by the database service 110 includes a database processing layer 113 (which may include one or more database nodes 114, sometimes also referred to as "head nodes"), along with a separate and distributed storage layer 112 (which may include multiple page storage nodes 116 that collectively perform some of the operations traditionally performed in the database processing layer of existing database systems). In some examples, the database service 110 also includes a backup storage layer, etc.

In general, a database is a set of data, collection of records, or other grouping of data objects stored in a data store. In some examples, a data store includes one or more directly or network-attached storage devices accessible to a database engine 118 (e.g., block-based storage devices like hard disk drives or solid-state drives). As indicated above, in some examples, the data store is managed by a separate storage layer 112. In some examples, management of the data store at a separate storage layer 112 includes distributing the data amongst multiple different storage nodes (e.g., page storage nodes 116A-116N) to provide redundancy and availability for the data.

In some examples, the data for a database is stored in one or more portions of the data store, such as data pages 124. One or multiple data values, records, or objects may be stored in a data page. In some examples, data pages further include metadata or other information for providing access to the database. For example, data pages can store data dictionaries, transaction logs, undo and redo log records, and so forth.

Generally, a "redo log" may be a write-ahead log of changes applied to contents of data pages, and can provide durability for all changes applied to the pages. Thus, each entry in a redo log may identify information describing a change to a database page, and the log entry can be used to modify a database page from a first state (prior to the change) to a second state (reflective of the change). Thus, the redo log includes "physical" type data reflective of how to change a "physical" representation of a "physical" database page, e.g., in terms of changing data that is stored via these pages. Thus, the redo log generally does not represent higher-level information such as the concept of transactions, tables, etc.

In contrast, a more "logical" type of log, such as a "binlog" (or WAL data segments of Postgres) store change information that is indicative of the type of change occurring in the database from the perspective of a database operation. For example, a binlog can store descriptions of events that indicate the changes made to the database being used, such as updates to values of one or more rows, an operation such as a new table being created or deleted, a column being added or deleted, etc. Binlogs can even provide information on statements that could have led to a potential change. Binlogs can be used to "replay" particular changes or "undo" particular changes to a database without being tied to any particular format or layout of the physical database pages; rather, binlog entries capture logical changes, that is, what database or table or record changes occurred.

A query engine 120 of a database engine 118 performs access requests (e.g., requests to read, obtain, query, write, update, modify, or otherwise access) based on state information. The state information can include, for example, data dictionaries, undo logs, transaction logs/tables, indexing structures, mapping information, data page caches or buffers, and the like, or any other information used to perform access requests with respect to the database. For example, state information may include mapping information (e.g., an index) used to obtain data records that match certain search criteria (e.g., query predicates).

In some examples, some operations of a database (e.g., backup, restore, recovery, log record manipulation, and/or various space management operations) are offloaded from the database engine 118 to the storage layer 112 and distributed across multiple storage nodes 116 and storage devices. For example, in some examples, rather than a database engine 118 applying changes to a database (or data pages thereof) and then sending the modified data pages to the storage layer 112, the application of changes to the stored database (and data pages thereof) is the responsibility of the storage layer itself. According to some examples, a database engine 118 may operate using local copies of pages but instead sends "redo log" records, rather than modified data pages, to the storage layer. The storage layer then performs redo processing (e.g., the application of the redo log records) in a distributed manner (e.g., by a background process running on the page storage nodes 116A-116N), e.g., to form pages 124.

In some examples, log sequence numbers (LSNs) are assigned to the redo log records from a log sequence number space. Crash recovery (e.g., the rebuilding of data pages from stored redo log records) in some examples is performed by the storage layer 112 and may also be performed by a distributed background process. The storage layer maintains backup versions of data volumes in a separate storage system (e.g., in another storage service implemented as part of the cloud provider network 100) by leveraging peer-to-peer replication among storage nodes to identify and obtain new updates to data volumes for inclusion in backup versions.

In some examples, because only redo logs (and not modified data pages) are sent to the storage layer from the processing layer 113 there is comparatively much less network traffic between the database processing layer 113 and the storage layer 112 than in typical database systems. In some examples, each redo log may be on the order of one-tenth the size of the corresponding data page for which it specifies a change. Note that requests sent from the database processing layer 113 and the distributed storage layer 112 may be asynchronous and that multiple such requests may be in flight at a time.

In some examples, the database systems described herein may retain much of the structure of the "upper half" of a database instance (e.g., query parsing and query optimization layer, a query execution layer, and a transactionality and consistency management layer) in the processing layer 113 but may redistribute responsibility for at least portions of the backup, restore, snapshot, recovery, and various space management operations to the storage layer 112. Redistributing functionality in this manner and tightly coupling log processing between the database processing layer 113 and the storage layer 112 can improve performance, increase availability, and reduce costs when compared to traditional approaches to providing a scalable database, in some examples. For example, network and input/output (I/O) bandwidth requirements may be reduced because only redo log records (which are much smaller in size than actual data pages) may be sent across nodes or persisted within the latency path of write operations. In addition, the generation of data pages can be performed independently in the background on each storage node 116 (as foreground processing allows) without blocking incoming write operations. In some examples, the use of log-structured, non-overwrite storage may allow copy creation, backup, restore, snapshots, point-in-time recovery (PITR), and volume growth operations to be performed more efficiently, e.g., by using metadata manipulation rather than movement or copying of a data page. In some examples, the storage layer 112 may also assume the responsibility for the replication of data stored on behalf of clients (and metadata associated with that data, such as redo log records) across multiple storage nodes. For example, data and metadata of a database may be replicated locally (e.g., within a single availability zone 108 in which a collection of page storage nodes 116 executes on its own physically distinct, independent infrastructure) and across availability zones 108 in a single region or in different regions.

In some examples, database systems described herein support a standard or custom API for a variety of database operations. For example, the API may support operations for creating a database, creating a table, altering a table, creating a user, dropping a user, inserting one or more rows in a table, copying values, selecting data from within a table (e.g., querying a table) canceling or aborting a query, creating a snapshot, performing an online restore or "backtrack" operation, among other possible operations.

In some examples, each data page may be stored in a segment, such that each segment (e.g., segment 122A) stores a collection of one or more pages 124, redo logs 126, and change log data 140. The pages 124 may include data pages constructed based on the redo logs 126 and/or change log pages constructed based on the change log data 140. Thus, change logs and/or redo logs 126 may be segmented to the protection group 128 of which the segment is a member. In some examples, data pages and redo logs and change logs are mirrored across multiple storage nodes, according to a variable configuration, such as in a protection group 128 (which may be specified by the client on whose behalf the databases are being maintained in the database system). For example, in some examples, one, two, or three copies of the data or redo logs or change logs may be stored in each of one, two, or three different availability zones or regions, according to a default configuration, an application-specific durability preference, or a client-specified durability preference.

In some examples, a user's database created using a database service 110 is implemented by one or more database nodes 114, each hosting a database engine (e.g., database engine 118), and a fleet of page storage nodes 116. In some examples, a database engine 118 includes various components associated with a traditional database kernel, including a query engine 120 and other components implementing transactions, locking, buffer cache, access methods, and undo management. In some examples, a database engine 118 receives requests (e.g., queries to read or write data, etc.) from various client 105 applications, parses the requests, optimizes the requests, and develops an execution plan to carry out the associated database operations. In some examples, the database engine 118 returns query responses to client applications, which may include write acknowledgements, requested data pages (or portions thereof), error messages, and other responses as appropriate.

In some examples, a database node 114 is responsible for receiving SQL requests from client applications, e.g., through an Open Database Connectivity (ODBC) or Java Database Connectivity (JDBC) interface, and for performing SQL processing and transaction management (which may include locking) locally. However, rather than generating data pages locally and sending them for storage, the database node 114 (or various components thereof) may both update/generate a data page based on a change but also generate redo log records, and send these redo log records to the appropriate page storage nodes 116 of a separate distributed storage system. In some examples, a client-side driver 130 for the distributed storage system hosted on the database node 114 is responsible for routing redo log records 132 to the storage system node(s) 116 that store the segments to which those redo log records 132 are directed.

Additionally, in some cases users of the database service 110 may desire to enable change logs, e.g., in the form of binary logging (or "bin logging") via use of a binlog. Generally, a binlog is one type of change log that may be a set of one or more files containing a record of all statements that attempt to change table data of the database (e.g., updates, insertions, deletions). These statements can be replayed to bring secondary servers up to date in a replication scenario, to bring a database up to date after restoring table data from a backup, etc. In many databases, change logging can be turned on and off.

Thus, in some implementations, for database statements that change table data of the database, another stream of data—in the form of change log records 133—is also sent to ones of the page storage nodes 116 and stored as change log data 140.

In some examples, each segment 122 of a database is replicated (or otherwise made durable) on multiple storage system nodes 116 that form a "protection group." In such examples, the client-side driver 130 tracks the page storage nodes 116 on which each segment is stored and routes redo log records 132 to all of the nodes on which a segment is stored (e.g., asynchronously and in parallel) when a client request is received. As soon as the client-side driver 130 receives an acknowledgment back from a write quorum of the page storage nodes 116 in the protection group (which may indicate that the redo log record has been written to the storage node), it sends an acknowledgment of the requested change to the database processing layer (e.g., to the database node 114). For example, in examples in which data is made durable through the use of protection groups 128, the database node 114 may not be able to commit a transaction until and unless the client-side driver 130 receives a reply from enough page storage nodes 116 to constitute a write quorum, as may be defined in a protection group policy for the data.

In some examples, the database processing layer 113 (or, more specifically, a database node 114) includes a cache in which recently accessed data pages are held temporarily. In such examples, if a write request is received that targets a data page held in such a cache, in addition to sending a corresponding redo log record 132 to the storage layer, the database engine applies the change to the copy of the data page held in its cache. A data page held in this cache may not ever be flushed to the storage layer and may be discarded at any time (e.g., at any time after the redo log record for a write request that was most recently applied to the cached copy has been sent to the storage layer and acknowledged). The cache may implement any of various locking mechanisms to control access to the cache by at most one writer (or multiple readers) at a time, in different examples. Note, however, that in examples that include such a cache, the cache may not be distributed across multiple nodes but may exist only on the database node 114 for a given database instance. Therefore, there may be no cache coherency or consistency issues to manage.

As indicated above, in some examples, a database node 114 includes a client-side storage driver 130, which routes read requests or redo log records 132 to various page storage nodes 116 within the storage layer 112, receives write acknowledgements from the storage layer 112, receives requested data pages from the storage layer 112, or return data pages, error messages, or other responses to a database engine 118. In some examples, the client-side driver 130 running on the database node 114 may expose a private interface to one or more other components (e.g., other database engines or virtual computing service components). In some examples, storage for a database instance in the storage layer may be modeled as a single volume that can grow in size without limits and that can have an unlimited number of Input/Output Operations Per Second (IOPS) associated with it. When a volume is created, it may be created with a specific size, with specific availability/durability characteristics (e.g., specifying how it is to be replicated) and with an IOPS rate associated with it (e.g., both peak and sustained). A variety of different durability models may be supported, and users may be able to specify, for their database, a number of replication copies, availability zones, or regions and whether replication is synchronous or asynchronous based upon their durability, performance, and cost objectives.

In some examples, the client-side driver 130 may maintain metadata about each volume and directly send asynchronous requests to each of the page storage nodes 116 necessary to fulfill read and write requests without requiring additional hops between storage nodes. In some examples, the volume metadata indicates which protection groups 128, and their respective page storage nodes 116, maintain which partitions of the volume. For example, in some examples, in response to a request to make a change to a database, the client-side driver 130 determines the protection group 128, and its one or more page storage nodes 116 that are implementing the storage for the targeted data page, and routes the redo log record(s) 132 specifying that change to those identified storage nodes. The page storage nodes 116 may then be responsible for applying the change specified in the redo log record to the targeted data page at some point in the future. As writes are acknowledged back to the client-side driver 130, the client-side driver 130 may advance the point at which the volume is durable and may acknowledge commits back to the database processing layer, in some examples. As previously noted, in some examples, the client-side driver 130 may not ever send data pages to the page storage nodes 116. This may not only reduce network traffic but may also remove the need for the checkpoint or background writer threads that constrain foreground processing throughout in previous database systems.

In some examples, many read requests may be served by the database node 114 cache. However, write requests may require durability since large scale failure events may be too common to allow only in-memory replication. Therefore, the systems described herein may minimize the cost of the redo log record write operations that are in the foreground latency path by implementing data storage in the storage layer as two regions: a small append-only log-structured region into which redo log records 132 are written when they are received from the database processing layer, and a larger region in which redo log records are coalesced together to create new versions of data pages in the background. In some examples, an in-memory structure may be maintained for each data page that points to the last redo log record for that page, backward chaining redo log records until an instantiated data block is referenced. This approach may provide good performance for mixed read-write workloads including applications in which reads are largely cached.

In some examples, copies of databases may be created in the storage layer that share data pages with the source of the copy. For example, a copy of a portion of a database (e.g., an extent of a database cluster volume 134) may be stored on the same storage node as the source database and include pointers to data pages stored in the source database so that the resulting amount of storage consumed by the copy is limited to storing changes to data pages that differ from the original copy, providing a copy-on-write technique for creating and updating copies of a database. Although not illustrated in FIG. 1, in some examples, the page storage nodes 116 also interface with a separate backup data store, system, service, or device. In this example, various data, such as data pages, redo log records, and any other data maintained by distributed storage service internal clients, such as database service 110 or other virtual computing services, or external clients, may be sent periodically to a backup data store.

In some examples, different storage policies are implemented by the database service 110. Examples of such storage policies include a durability policy (e.g., a policy indicating the number of instances of a database (or data pages thereof) that will be stored and the number of different storage nodes on which they will be stored) and a load balancing policy (which may distribute databases, or data pages thereof, across different storage nodes, volumes, or disks in an attempt to equalize traffic). In addition, different storage policies may be applied to different types of stored items by various services. For example, in some examples, the storage service may implement a higher durability for redo log records than for data pages, etc.

As indicated above, in some examples, a database service 110 replicates users' databases to provide resiliency to failure. In some examples, a user's database is partitioned into fixed size segments 122, each of which is replicated across the page storage nodes 116. In some examples, each set of fixed sized segments replicated across the page storage nodes 116 is grouped into a "protection group" (e.g., one of protection groups 128), such that each protection group consists of N fixed size segments organized across M availability zones 108. In some examples, a logical database cluster volume 134 used to store the data of a database is thus a concatenated set of protection groups 128, physically implemented using a fleet of storage nodes (e.g., including page storage nodes 116A-116N) provided as virtual hosts with attached SSDs. In some examples, the protection groups that constitute a volume are allocated as the volume grows, where the database service 110 may support volumes that can grow up to a defined size limit (e.g., 64 TB or any other limit).

In some examples, a page storage node 116 includes hardware and software implementing various segment management functions. For example, each storage node may perform any or all of the following operations: replication (e.g., locally within the storage node), coalescing of redo logs to generate data pages, log management (e.g., manipulating redo log records), crash recovery (e.g., determining candidate redo log records for volume recovery), creating snapshots of segments stored at the storage node, and space management (e.g., for a segment or state storage). In some examples, each page storage node 116 has one or more attached storage devices (e.g., SSDs, HDDs, or other persistent storage devices) on which data blocks may be stored on behalf of clients.

In some examples, each of the page storage nodes 116 implements processes running on the node that manage communication with one or more database node 114, for example, to receive redo log records 132, send back data pages, etc. In some examples, data blocks written to the storage system may be backed up to long-term or archival storage (e.g., in a remote key-value durable backup storage system).

In some examples, a storage layer 112 implements a storage service control plane that performs various storage system management functions. For example, a storage service control plane may implement a volume manager, which may maintain mapping information or other metadata for a database cluster volume 134, such as current volume state, current writer, truncation tables, or other truncation information, or any other information for a volume as it is persisted in varying extents, segments, and protection groups. In some examples, the volume manager communicates with a client-side driver 130 to "mount" or "open" the volume for the client, providing the client-side driver 130 with mapping information, protection group policies, and various other information used to send write and read requests to page storage nodes 116. The volume manager may provide the maintained information to storage clients, such as a database node 114 or client-side driver 130 or to other system components such as a backup agent. For example, the volume manager may provide a current volume state (e.g., clean, dirty, or recovery), current epoch or other version indicator for the volume, or any other information about a data volume.

FIG. 1 illustrates a process that includes a database node 114 processing database traffic 136. In some examples, clients 105 of the database service 110 may submit queries and other requests associated with a particular database instance in a number of ways, e.g., interactively via an SQL interface to the database system. In some examples, external applications and programs may submit queries using ODBC or JDBC driver interfaces to the database system.

In some examples, database traffic 136 is received and processed by the database instance, where the traffic includes operations that modify the content of the database. In some examples, clients 105 of the database instance can include any type of client configurable to submit requests to network-based services via a network, including requests for database services (e.g., a request to create a copy of a database, etc.). For example, a given client may include a suitable version of a web browser or may include a plug-in module or other type of code module that can execute as an extension to or within an execution environment provided by a web browser. Alternatively, a client 105 can include a database application, a media application, an office application, or any other application that makes use of persistent storage resources to store and access one or more databases. In some examples, such an application includes sufficient protocol support (e.g., for a suitable version of HTTP) for generating and processing network-based services requests without necessarily implementing full browser support for all types of network-based data. That is, a client 105 may be an application that can interact directly with the cloud provider network 100 or within the cloud provider network 100. In some examples, clients may generate network-based services requests according to a Representational State Transfer (REST)-style network-based services architecture, a document-based or message-based network-based services architecture, or another suitable network-based services architecture. Accordingly, a client 105 may be executed by a computing device 104 outside of the provider network 100 or within the provider network 100 (e.g., as an application executed by a hardware virtualization service, for example).

In some examples, the database traffic 136 is generated by a client 105 application that provides access to storage of databases or other applications in a manner that is transparent to those applications. For example, the client 105 application may integrate with an operating system or file system to provide storage in accordance with a suitable variant of the storage models described herein. However, the operating system or file system may present a different storage interface to applications, such as a conventional file system hierarchy of files, directories, or folders. In such an example, applications may not need to be modified to make sure of the storage system service model. Instead, the details of interfacing to the cloud provider network 100 may be coordinated by the client application and the operating system or file system on behalf of applications executing within the operating system environment. In some examples, the client application generating database traffic 136 send network-based services requests (e.g., a request to create a copy of a database, queries to a database, etc.) to and receive responses from the cloud provider network 100 via one or more intermediate networks 106.

In some examples, a cloud provider network 100 implements various user management features. For example, the cloud provider network 100 may coordinate the metering and accounting of client usage of network-based services, including storage resources, such as by tracking the identities of requesting clients, the number or frequency of client requests, the size of data tables stored or retrieved on behalf of the clients, overall storage bandwidth used by clients, class of storage requested by clients, or any other measurable client usage parameter. In some examples, a cloud provider network 100 also implements financial accounting and billing systems or may maintain a database of usage data that may be queried and processed by external systems for reporting and billing of client usage activity. In some examples, the cloud provider network 100 collects, monitors, or aggregates a variety of storage service system operational metrics such as metrics reflecting the rates and types of requests received from clients, bandwidth utilized by such requests, system processing latency for requests, system component utilization, rates and types of errors resulting from requests, characteristics of storage and requested data pages or records thereof (e.g., size, data type, etc.) or any other suitable metrics. In some examples, such metrics may be used by system administrators to tune and maintain system components, while in other examples such metrics may be exposed to users to enable such users to monitor their usage of the database service 110 and other services.

In some examples, a cloud provider network 100 also implements user authentication and access control procedures. For example, for a given network-based services request to access a particular database instance, the cloud provider network 100 may ascertain whether the requesting client associated with the request is authorized to access the particular database instance. The cloud provider network 100 may determine such authorization by, for example, evaluating an identity, password, or other credential against credentials associated with the particular database, or by evaluating the requested access to the particular database against an access control list of the particular database, in some examples. For example, if a client does not have sufficient credentials to access a particular database, the cloud provider network 100 may reject the corresponding request, for example, by returning a response to the client indicating an error condition.

As indicated herein, when many traditional databases modify a data page (e.g., in response to a write operation), they generate a redo log record and invoke a log applicator that applies the redo log record to the in-memory before-image of the page to produce its after-image. Transaction commit requires the log to be written, but the data page write may be deferred. As described herein, in some examples of the database service 110, the writes that cross the network are redo log records 132. As shown in FIG. 1, a database engine 118 processing a write sends redo log records 132 to the storage layer 112.

In some examples, the log applicator functionality is implemented at the storage layer 112 where it can be used to generate database pages in the background or on demand. Generating each page from the complete chain of its modifications from the beginning of time may be prohibitively expensive and, thus, in some examples, each page storage node 116 continually or periodically materializes database pages in the background to avoid regenerating them from scratch on demand each time. The storage nodes use the redo log records (e.g., redo logs 126 associated with segment 122A) to apply changes to their buffer caches. The database engine awaits quorum from the storage nodes to satisfy the write quorum and to consider the redo log records in question durable or hardened.

As indicated above, database query requests of database traffic 136 typically include requests to write to various data pages of a database instance. These requests are parsed and optimized to generate one or more write record requests, which may be sent to the client-side driver 130 for subsequent routing to the storage system. In this example, the client-side driver 130 generates one or more redo log records 132 corresponding to each write record request and sends them to specific ones of the page storage nodes 116 of specific protection groups 128 storing the partition user data of user data space to which the write record request pertains. In some examples, page storage nodes 116 perform various peer-to-peer communications to replicate redo log records received at a storage node to other storage nodes that may not have received the redo log records. In some examples, the client-side driver 130 generates metadata for each of the redo log records that includes an indication of a previous log sequence number of a log record maintained at the specific protection group.

In some examples, each redo log record 132 is associated with an LSN that is a monotonically increasing value generated by the database. In some examples, a database node 114 continuously interacts with the storage layer 112 and maintains state to establish quorum, advance volume durability, and register transactions as committed. As the database receives acknowledgements to establish the write quorum for each batch of redo log records, it advances the current volume durable LSN (VDL). As noted, a data volume may consist of multiple extents, each represented by a protection group consisting of one or more segments. In some examples, redo log records 132 directed to different extents may have interleaved LSNs. For changes to the volume to be durable up to a particular LSN, it may be necessary for all redo log records up to that LSN to be durable, regardless of the extent to which they belong. In some examples, the client-side driver 130 keeps track of outstanding redo log records that have not yet been made durable, and once all redo log records up to a specific LSN are made durable, it may send a volume durable LSN (VDL) message to one of the protection groups in the volume. The VDL may then be written to all synchronous mirror segments for the protection group.

As described above, in some implementations of a distributed database service 110, (at least) two important streams of data may be sent from the database nodes 114 to the storage layer (e.g., page storage nodes 116)—the redo log records 132 and, if enabled, change log records 133.

Many users want to utilize the change log, e.g., to track data changes related to change data capture (CDC) for auditing, copying data to another system, reacting to events, etc. However, in many database systems, the use of a change log (e.g., the binlog in MySql) is typically disabled by default. This is partially because, when enabled, the performance of the database goes down significantly—perhaps as much as 75%—which further makes the database not scalable. This is because, for every database transaction, the database engine 118 generates these two streams: redo log records 132 and change log records 133. These records need to be persisted in an atomic manner (e.g., using a "2 phase commit" (2PC) technique), which drops the overall performance of the system significantly. Further, when users need to read this change log data—on top of the writing of the change log data, as well as the writing of the redo logs, and the use of the redo logs for regular database use—the reader occupies a lot of computing resource(s) (e.g., the CPU) of the page storage nodes 116 and/or database nodes 114, and thus the foreground I/O is reduced even further (e.g., as the CPU is less available for regular databases operations). Accordingly, there exists a strong need to enable change logs/binlogging in distributed database systems for replication, auditing, and other reasons, but without the significant negative effects that arise as a result, such as the typical performance degradations.

Figure 2:
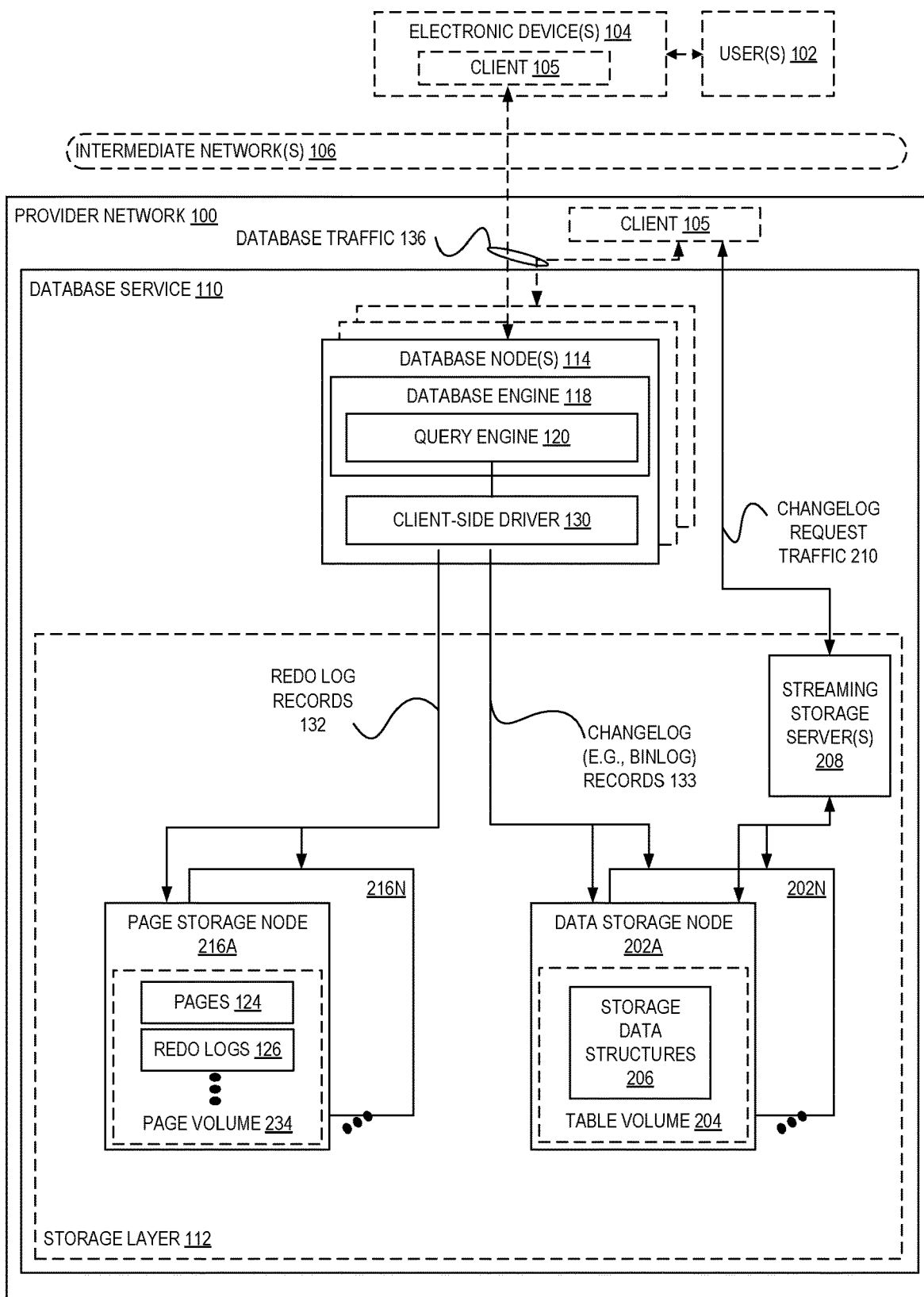
FIG. 2 illustrates an exemplary system including a distributed relational database service provided by a service provider network utilizing split volume types for redo log records and change log records according to some examples.

To this end, FIG. 2 illustrates an exemplary system including a distributed relational database service provided by a service provider network utilizing split volume types for redo log records and change log records according to some examples.

As shown in this figure, in some examples the redo log records 132 may still be written to a first set of one or more database page volumes 234 provided by page storage nodes 216, but the system may utilize a new type of volume—a "table" volume 204 provided by separate set of data storage nodes 202A-202N having storage data structures 206. In this configuration, each data storage node 202 hosting a table volume 204 has one or more storage data structures that may store and/or index individual change log records. As a result, when a database node 114 (or "head node") performs a write to the data (e.g., for an insertion, deletion, update, etc.) of the database, the write can be performed in parallel in that the redo log records 132 are sent to the page storage node(s) 216 and the change log records 133 are sent to the data storage nodes 202. Moreover, examples need not perform these writes in a 2PC process, as when a write happens each gets committed, and a recovery algorithm can handle determining which one happens in what order—i.e., which goes first, second, etc. In some examples, the change log events can be sent as they occur without having to wait for transaction completion, and this architecture produces an advantage in that there is no loss of information in cases where the transaction is rolled back. For example, it is useful to know the number and type of transactions that are rolled back once these transactions have made modifications, which assists application developers with a better design of their solution.

In addition to this parallelism, in some examples reads involving the change log records (e.g., change log request traffic 210) can bypass going through the database nodes 114 and instead be issued directly to one or more streaming storage servers 208, which can directly interact with the data storage nodes 202 to obtain the necessary change log data and return this data to the client 105. As a result, the processing load on both the database nodes 114 as well as the page storage nodes 216 is significantly reduced due to the change log reads and writes being completely removed from their burden.

Figure 3:
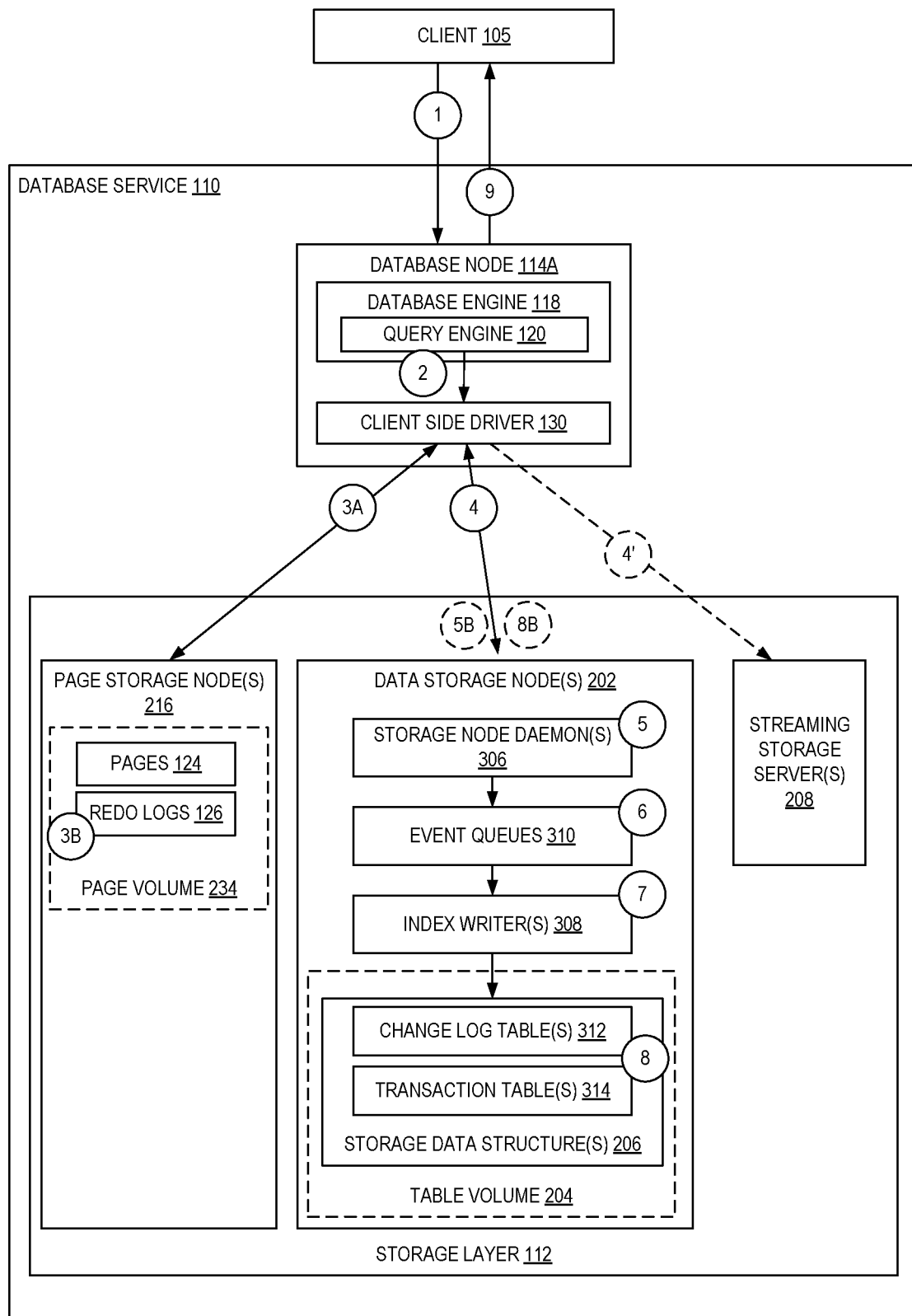
FIG. 3 illustrates an exemplary architecture of a table volume and exemplary write operations in a distributed relational database service utilizing split volume types for redo log records and change log records according to some examples.

For further detail, FIG. 3 illustrates an exemplary architecture of a table volume and exemplary write operations in a distributed relational database service utilizing split volume types for redo log records and change log records according to some examples. At circle (1), a database client 105 interacts with the database by, for example, issuing a SQL statement to a head node (e.g., database node 114A), which may be an UPDATE, DELETE, INSERT, or the like. At circle (2), the database engine 118 processes the request to generate redo log records and change log records. These records are sent to the client-side driver 130, which serves as an interfacing driver between the database engine 118 and the storage layer 112. The client-side driver 130 translates the redo log record(s) into a language that can be interpreted by the page storage node(s) 216, determines which page storage nodes 216 to write to, e.g., based on quorum and any other requirements, and sends, at circle (3A), redo log record writes to one or more database page volumes 234 provided by the page storage nodes 216, which are written to redo logs 126 at circle (3B) as discussed in greater detail above. The client-side driver 130 also sends the change log record writes at circle (4) to one or more data storage nodes 202. These change log records may have been adorned with other data, such as a transaction ID, LSN chain, etc. Prior to sending these records, the client-side driver 130 determines to which data storage nodes 202 the change log events are to be sent to. In some examples, the client-side driver 130 also sends commit records, which may be adorned with data indicating shards (e.g., segments, or portions of segments) where change log events are stored.

The client-side driver 130, when a commit is made durable (e.g., by the data storage nodes 202), notifies the streaming storage server(s) 208 as shown by circle (4')—the streaming storage server(s) may then process the change data request almost immediately.

Upon receipt of a change log record, at circle (5) storage node daemon(s) 306 get the "write" and processes it to cause these records to be stored. For example, in some examples at the daemon(s) 306 create entries in one or more event queues 310 at circle (6), which are serviced at circle (7) by one or more index writers 308. These index writer(s) 308 take the event queue 310 entries and update storage data structures 206 accordingly at circle (8).

For example, in some examples the change log records are stored in a database-like data structure such as a B-Tree or the like forming change log tables 312, which may be indexed with one or more keys. The index writers 308 may also update one or more transaction table 314 data structures with transaction metadata associated with sets of the change log records and may indicate which transactions carrying change log records are or are not committed.

As a result, a number of indexes may be formed over potentially a variety of data entities, such as transactions, change log records themselves, user table identifiers, etc., allowing for various forms of efficient querying.

In some examples, the persistence of the change log records may be acknowledged by the data storage nodes 202 to the client-side driver 130, e.g., after the storage node daemon(s) receive and process the change log records (at circle (5B)) and/or after the index writers 308 have indexed this data (at circle (8B)). Thereafter, when the change log records and the redo logs have been updated, the modification can be reported back to the database client 105 as shown via circle (9).

For further detail, FIG. 4 illustrates exemplary change log records in a change log table 312 and exemplary transaction records in a transaction table 314 in a distributed relational database service utilizing split volume types for redo log records and change log records according to some examples. As indicated above, the data storage nodes 202 may store data pertaining to change log records in one or more data structures, such as change log tables 312, transaction tables 314, etc.

For example, each stored change log record 402A-402M in the change log table 312 may include one or more of the following fields, some or all having come from the change log record and/or its header (populated by the head node): a LSN value, the database name the record pertains to, a transaction ID, a shard sequence number, a timestamp (e.g., of when the statement began executing), an event type (e.g., a type code from the database), an event length indicating a length of the event, any event flags, an offset in the transaction, the actual change log change data itself, etc. In some examples, other fields could be extracted from change log events, such as a table name (of the table associated with the event), a column name, etc. In some examples, this table may be indexed over one or more columns—e.g., over transaction ID and/or shard sequence number.

As another example, transaction data pertaining to the change log events may be stored in a transaction table 314 as records 404A-404N. In some examples, each record includes one or more of the following fields: a transaction ID, a shard sequence number, a commit sequence number (the global sequence number of committed transactions), a commit status (e.g., committed or rolled back or started), a begin transaction timestamp, an end transaction timestamp, a server ID of the server that committed the transaction, a begin LSN, an ending LSN, a file name, a file offset, a list of associated shards, a total change data length, etc. In some examples, this table may be indexed over one or more columns—e.g., over the commit sequence number.

With these indexes, a streaming storage server 128 can provide a variety of types of access to the change log data without needing to involve the database nodes 114 or page storage nodes 216. However, in some examples, the operations of the streaming storage server 128 could be implemented in one or more of the database nodes 114, which would beneficially eliminate the need for the storage servers (and thus, easier configuration for the clients) though it may, in comparison to the use of storage servers, increase processing load on the database nodes.

As presented herein, in some examples utilizing multiple volumes, complexity is shifted from the database engine to the storage layer, and the compute resources provided by the storage layer can instead be used for operations such as sorting and indexing. Via use of table volumes, awareness is given to the storage layer about data that gets written, such as the transaction identifier, table name, file offsets, etc. Thus, data storage nodes can create indexing on these fields, and in some examples, a head database node (or the control plane of the service) can even directly issue queries to the data storage nodes to obtain information that may be helpful in some scenarios. Moreover, logical change data such as binlog data can get written in a completely asynchronous fashion in table volumes 204 while the typical redo logs can be written in a separate page volume 234.

As indicated herein, in some examples a table volume utilizes multiple data structures to maintain its logical data—here, a change log table and a transaction table. Writes of binlog events can occur in the change log table, and once a transaction gets committed, the state may be kept in the transaction table, e.g., the transaction table may store the order of committed transaction. These logical tables can be implemented in a wide variety of formats, such as via use of a key-value data structure, relational database, etc. As indicated above, the change log table could include information such as the LSN of the update, an associated transaction ID, an offset, a length, and the actual change log. Likewise, the transaction table could include information such as a transaction ID, offset, length, file-name, commit LSN, a list of protection groups, etc.

This multi-volume configuration can provide a variety of technical benefits. For example, increase performance is provided in many use cases. As the system may now asynchronously write the binlog, a commit doesn't necessarily need to wait for binlog events to be written. Moreover, the write of transaction log records and binlog events can happen in parallel.

Thus, in some examples, page volumes can be used to store database pages, database engine logs, etc., and do not need to be shared with binlogs, which means any retention period will not be restrained by the size of the page volume.

Moreover, in the case of point-in-time restores (e.g., due to a defunct segment), the restores can be zero-data loss without any "lost" transactions due to having the binlogs on a separate volume, and moreover, recovery time can be drastically reduced—e.g., from minutes to seconds or even fractions of a second.

Figure 5:
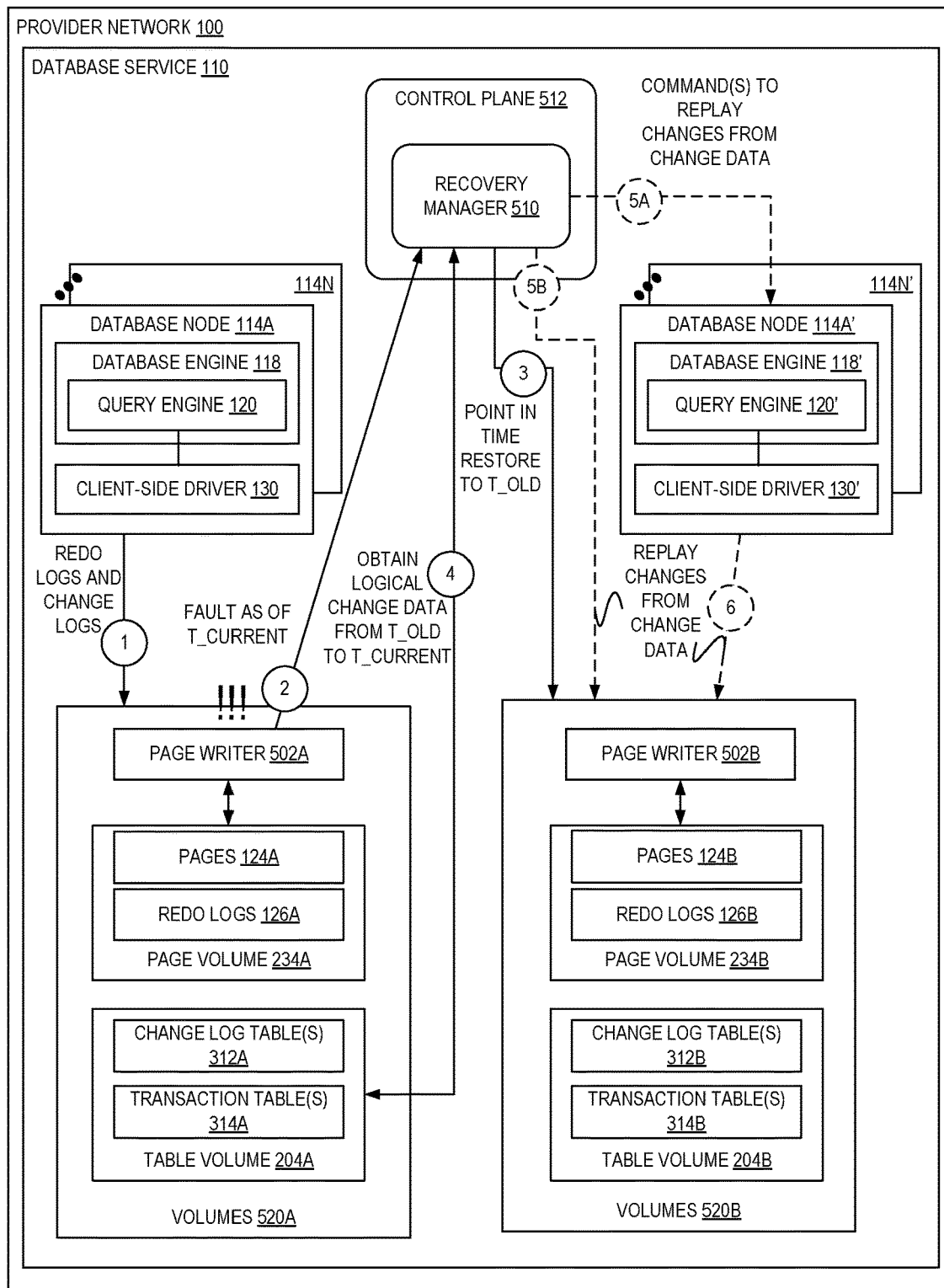
FIG. 5 illustrates an example system and operations for lossless database recovery using logical replay in a multi-volume database environment according to some examples.

FIG. 5 illustrates an example system 500 and operations for lossless database recovery using logical replay in a multi-volume database environment according to some examples.

In some examples, the write of a transaction involves multiple stages. For example, a transaction write may include a (1) "binlog prepare" stage (e.g., determining whether the binlogs for a transaction are able and ready to be written), a (2) "redo log prepare" stage (e.g., determining whether the redo logs for a transaction are able and ready to be written), a (3) "binlog commit" stage (that commits the associated entries in the table volume), and a (4) "redo log commit" stage (that commits the associated entries in the page volume).

In single volume systems, if a crash occurs prior to stage (3), the transaction can be rolled back, otherwise, the system can roll-forward. In a dual volume system described herein, if a crash occurs prior to stage (3), the transaction can be rolled back; however, if the crash occurs between (3) and (4), the system can either rollback or roll-forward. However, rollback in cases can be technically proper as the commit of the transaction has not been acknowledged to the client.

In single volume systems (e.g., using binlogs in the database cluster volume), performing recovery may take a fair amount of time, e.g., several minutes. This is because the recovery process may require that the last binlog file needs to be read, where all transactions are read one by one and it is determined whether each has been committed—if the last transaction is not committed, that transaction is rolled back. Other transactions that are committed may be given to the database engine to roll-forward, which increases the recovery time. With a dual volume system, as transaction awareness now exists, reading an entire binlog file may not any longer be needed. Instead, the table volumes can directly return the set of transactions that are known as not having been written to the page volume and the database engine can roll-forward those transactions. This process can bring down the recovery time to seconds or even fractions of a second in some cases.

Recovery of a volume involves physical recovery and then logical recovery. As part of physical recovery, the VDL needs to be determined. As described herein, a VDL, or volume durable LSN, indicates a latest LSN that is guaranteed to be consistently stored. In dual-volume systems, physical recovery needs to bring both the volumes consistent with each other. Broadly, there are three cases.

First, for those transactions that have been made to both the page volume and the table volume, nothing needs to be done. Second, for those transactions that made it to the page volume but not into the table volume, the system can "truncate" (or remove/ignore) the extraneous LSNs in the page volume to make it consistent with the table volume. Third, for transactions made in the table volume but not in the page volume, the system can either truncate the table volume records and make it consistent with the page volume or update the page volume based on the table volume.

In FIG. 5, a cluster of database nodes 114A-114N may utilize a set of volumes 520A, e.g., both a page volume 234A and a table volume 204A. In some examples, one of the database nodes 114A-114N (e.g., database node 114A) may be configured (or elected by the cluster) to be a designated writer, whereas the others may simply be readers; however, many other configurations are possible, e.g., all could read and write, multiple writers could exist, etc. Thus, the database node 114A may receive database statements (e.g., SQL statements seeking to create, replace, update, and/or delete data, tables, indices, etc.) and write redo logs and/or change logs to the volumes 520A as shown at circle (1), e.g., via use of its client-side driver 130.

As indicated herein, the page storage node(s) may generate (or "materialize") database pages 124A by applying the redo logs 126A, which may occur via a page writer 502A component. Although not extremely frequent, it is known that databases can have various issues that can lead to failures. For example, a bug in the page writer or database engine, a checksum issue, a bitflip, etc., can cause an issue when attempting to apply redo logs 126A to a database page 124A, leading to an occurrence when the logs cannot be successfully used.

For example, a page number mismatch could occur where the page writer 502A may think a particular redo log pertains to a particular data page (e.g., "page 100"), but the metadata associated with the redo log indicates that it pertains to a different data page (e.g., "page 110"). In this case, the redo log cannot be applied, and many other similar scenarios can likewise occur. When one of these happens, in single-volume systems there is typically no way to recover from the error scenario, leading to what can be referred to as a "defunct segment" where a volume becomes defunct/not usable. In some examples, as shown at circle (2), the control plane 512 (of the database service, or of the storage layer or a portion thereof) can be notified of the issue, e.g., either directly from page storage node 216/page writer 502A/database node 114A-114N, or indirectly via another service or system that is made aware of the issue (e.g., a monitoring service).

In such cases, in single-volume systems the only way to recover is to perform a point-in-time restore, where the timing of the problematic log record is identified, and the system goes back some amount of time prior to the log record's time (e.g., a minute) and restores itself to that time. While that approach brings the database back to a point where all transactions were successfully committed, all transactions or updates that occurred during that time period (e.g., the one-minute time period between the restore time and the problematic log record time) are lost. Accordingly, users will experience data loss, which requires the database's users to attempt to recover from that, which may or may not be successful. However, in a multi-volume system disclosed herein, when table volumes are enabled, full recovery can be performed without data loss in such scenarios.

As described herein, when a transaction is committed, the data is committed in both the page volumes and the table volumes. Thus, logical data always exists.

Accordingly, as shown at circle (3), a recent point-in-time restore (e.g., to time T_OLD) can be initiated by recovery manager 510 and performed as described above with regard to single-volume systems, e.g., via use of backup data stored in another storage system (e.g., an object storage location provided by an object storage service of the provider network), data from the volumes 520A, etc. Such a restore can be performed using a new set of volumes 520B, which can also include utilizing a new cluster of processing database nodes 114A'-114N', though this is not strictly necessary in all examples.

Thereafter, the missing data changes in the page volume 234 can be "filled in" through use of the logical data from the initial table volume 204A. Thus, at circle (4), the recovery manager 510 can obtain logical change data from the table volume 204A pertaining to committed updates that occurred between the time of the fault (T_CURRENT) and the restored time (T_OLD), and this logical change data can be used to apply those same changes, again, to the restored page volume 234B. For example, as shown at circle (5A), the recovery manager 510 can send one or more commands to the "new" database engine 118' to, using the restored page volume 234B, replay the changes indicated by the logical change data as shown at circle (6), thus yielding a fully restored set of volumes 520B, and the earlier "problematic" volumes 520A and/or database node(s) 114A-114N can be terminated and the new versions thereof can be utilized in their place. Alternatively, the recovery manager 510 itself could directly interact with the volumes 520B (or indirectly interact with the volumes 520B by way of a separate, non-illustrated control plane 512 entity or service) to cause the changes to be replayed or otherwise implemented as shown via circle (5B).

For example, if a current connection point is labeled "150," where a transaction at point "150" is committed and acknowledged back to the client. However, if some occurs when applying the corresponding redo logs to the associated database pages, the volume becomes defunct and non-operational. The recovery manager 510 can identify a "safe" restorable time prior to the problematic transaction, e.g., connection point "145," and restore the volumes 520B to that point. The recovery manager 510 can then identify the "missing" transactions that were committed but do not exist in the page volume 234B, e.g., transactions "146" to "150." The recovery manager 510 can thus go to the table volume 204A to obtain data from those transactions ranging from numbers "146" to "150," and use this logical data by applying it to the restored cluster (e.g., via use of the database engine), resulting in a fully-restored database that is back at connection point "150."

As another more specific example, the database may be operational for a period of time, e.g., and as is known the binlog (in flat file format) will fill up to a particular size (e.g., 1 GB) and will be swapped out for another, and another, and so on. We assume that the binlog has reached the file #10 for the binlog, and it has reached offset 100 within this file when an error in the page volume 234A occurs. The recovery manager 510 may determine to perform a point-in-time restore to an earlier "coordinate"—e.g., to file 10 offset 20. Thus, changes from file 10 offset 20, to file 10 offset 100, would be missing.

The recovery manager 510 can thus perform the restore by restoring to a previous time, and optionally query the restored cluster to determine what its current coordinate is, whereby it can respond with an answer of file 10, offset 20. The recovery manager 510 can thus query the original table volume 204A to seek change data from file 10 offset 20 to file 10 offset 100. The page storage node will this data to the recovery manager 510, and the recovery manager 510 can send commands back through the head node of restored cluster to "replay" those logical changes.

Again, this system is not possible in single volume systems where the logical binlogs and physical redo logs are stored on a same volume—in those systems, if there is a problem with the volume, it cannot be repaired. Moreover, this approach beneficially does not have any issue with in-flight transactions-if one is not fully committed, the client expects that it is not yet committed, and thus the system does not necessarily need to recover it while the client should easily be able to recover. Further, the use of the logical change log information from a table volume is comparatively more reliable, as page writers 502 and the application of redo logs into pages is a much more complex operation that is prone to error, while the simple processing (or almost no processing) needed to write change logs to table volumes significantly reduces such issues.

As described and illustrated herein, in some cases a restore may create a "new" cluster or portion thereof, such as a new set of volumes 520B, and then switch the database nodes over to use these volumes 520B. However, in some examples, an existing cluster or portion thereof may simply be updated in-place.

Figure 6:
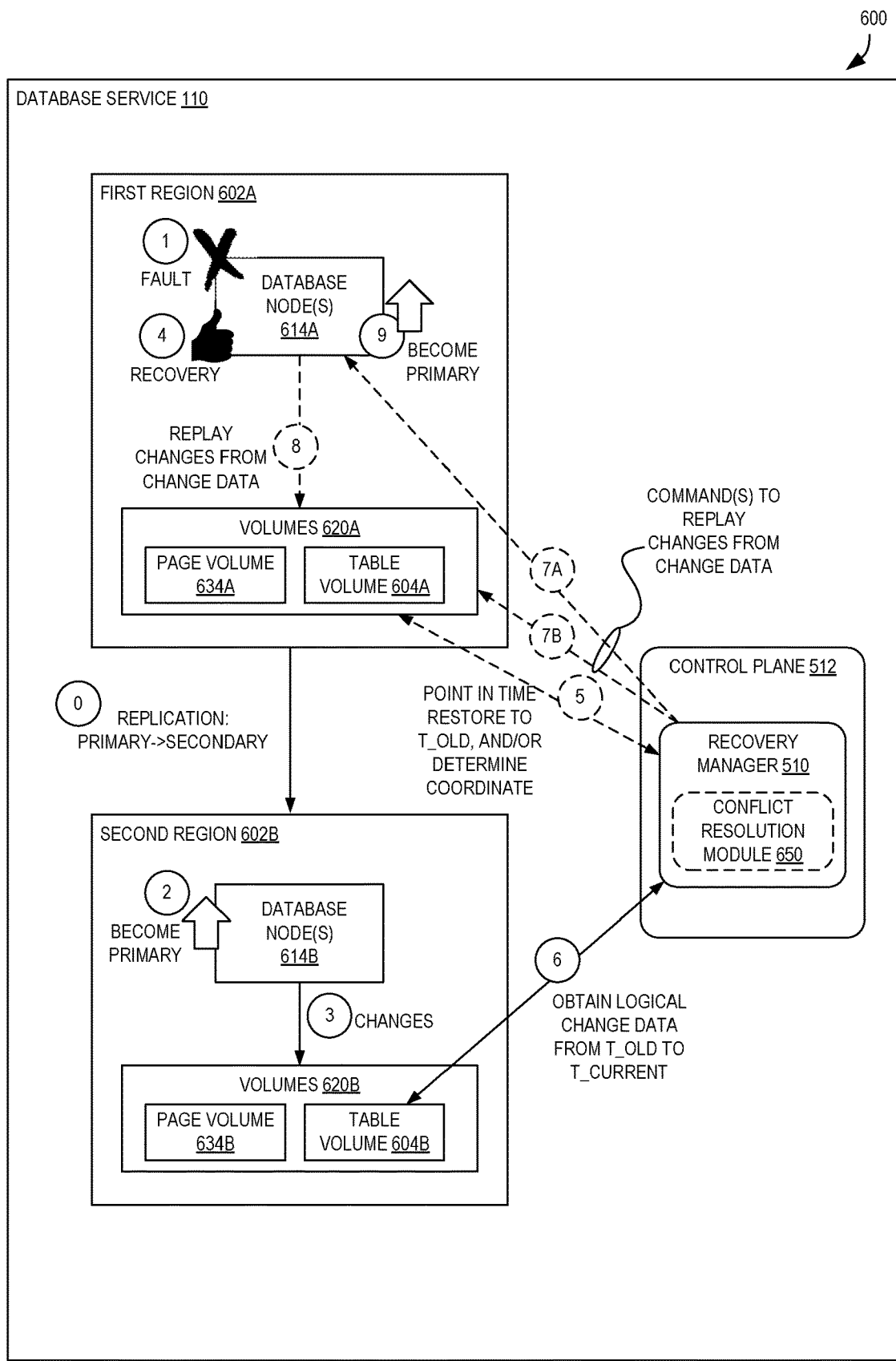
FIG. 6 illustrates an example system and operations for efficient unplanned multi-region failover database recovery using logical replay in a multi-volume database environment according to some examples.

FIG. 6 illustrates an example system and operations for efficient unplanned multi-region failover database recovery using logical replay in a multi-volume database environment according to some examples. In some examples, the lossless database recovery using logical replay in a multi-volume database environment can be applied to manage unplanned failovers in distributed databases (e.g., a global database).

A global database can be offered by a database service to provide support for globally distributed applications, allowing a single database to span multiple provider network regions. Such a system replicates the data of the database with no impact on database performance, enables fast local reads with low latency in each region, and provides disaster recovery from region-wide outages. In some examples, a global database can be implemented by configuring a replication scheme whereby a "primary" region may perform reads and writes to the data, and this data is replicated over to one or more "secondary" regions that typically only read from the data.

In some cases, such a global database may accommodate failure scenarios by having the "writing" database region (e.g., a designated writer node for the database in a first region) be shifted to another region (e.g., to a database node in a second region that may have previously been a read-only node) for a period of time, e.g., until the first region is again fully operational (e.g., a power loss is restored) and the original designated writer node can again become the writer.

In these cases, during the time period where the secondary region is acting as the "writing" region, it likely may perform updates to the database that are not present in the initial writing database region. As these systems are often configured with one-way replication-meaning updates can only flow in one direction, e.g., from the primary region to the secondary region(s), such systems cannot easily re-update the failed primary region when it again becomes available. However, using the multi-volume database environment logical replay techniques described herein, the primary region can be quickly, consistently, and easily updated to introduce the changes (made in the secondary region) back into the primary region.

In FIG. 6, as shown at circle (0), replication is configured in a one-way manner from a primary first region 602A to a secondary second region 602B, and thus changes made by the database node(s) 614A to its volumes 620A are also made in the second region 602B to the volumes 620B there. This scheme can include, for example, sending binlogs of the changes from the first region 602A to the second region 602B for replication as is performed by existing replication systems.

At some point a fault may occur as shown by circle (1), such as a problem with power, networking, hardware, etc., thus preventing the database node(s) 614A from being able to write to the database. Through a failover detection and handling technique known to those of skill in the art, a database instance (e.g., a database node 614B) in the second region can be promoted to become the "new" primary designated writer for the database at circle (2), allowing the database to continue to be operational despite the issue in the first region 602A. This database node 614B may process client traffic and make changes, as shown by circle (3), to the volumes 620B such as updates, deletes, insertions, schema changes, or the like.

At circle (4) the initial database instance(s) (e.g., database node(s) 614A) may recover from the issue and seek to again become the primary designated writer for the database, per the associated user's configuration. In some examples, the recovery manager 510 may detect this set of changes and may (optionally) cause a point in time rollback of the volumes 620A to some designated point in time (such as if there was resultant data loss), and/or interact with the database instance(s) (such as by interacting with the database nodes, and/or querying the table volume) to determine a database coordinate indicating a current data state of the volumes 620A.

Thereafter, the recovery manager 510 can obtain a set of changes that occurred to the volumes 620B during the failure period that need to be replayed into the first region 602A using techniques described herein at circle (6), and issue commands at circle (7A) back to the database node(s) 614A to "replay" these changes into its regional volumes 620A at circle (8)—or directly or indirectly (e.g., via a non-illustrated control plane 512 component) interact with the volumes 620A to replay the changes-allowing the first region 602A database node(s) 614A to once again become the primary designated writer for the global database at circle (9).

In some examples, the recovery manager 510 may further include a conflict resolution module 650 to accommodate potential conflicts that may arise during the restoration processes detailed with regard to circles (7A), (7B), (8), etc. For example, it may be the case that at the time of the fault of circle (1), the initial database node(s) 614A had performed some writes that did not get sent on to the second region 602B via the replication processes. Thus, these writes may not have been seen and applied in the second region 602B, and thus at the time of becoming primary at circle (2) and beginning to make changes (at circle (3)), the second region 602B may be making updates that may or may not be different due to the non-existence of the "missing" writes. Thereafter, when initial database node(s) 614A in the first region 602A again becomes the primary writer, and previously had its data updated based on some writes that the second region 602B never saw, the re-application of the changes (made into the second region but not the first) could cause conflicts—e.g., a row to be updated might not exist due to it having been deleted, etc. Thus, conflict resolution module 650 can examine the logical updates to be made to detect possible conflicts, and cause an action to be performed when conflicts are detected—e.g., alerting the associated user (e.g., to have them resolve the conflict), performing an automated conflict resolution (e.g., based on an earlier user configuration, such as ignoring a conflicting change, and/or generating an alert), etc.

Figure 7:
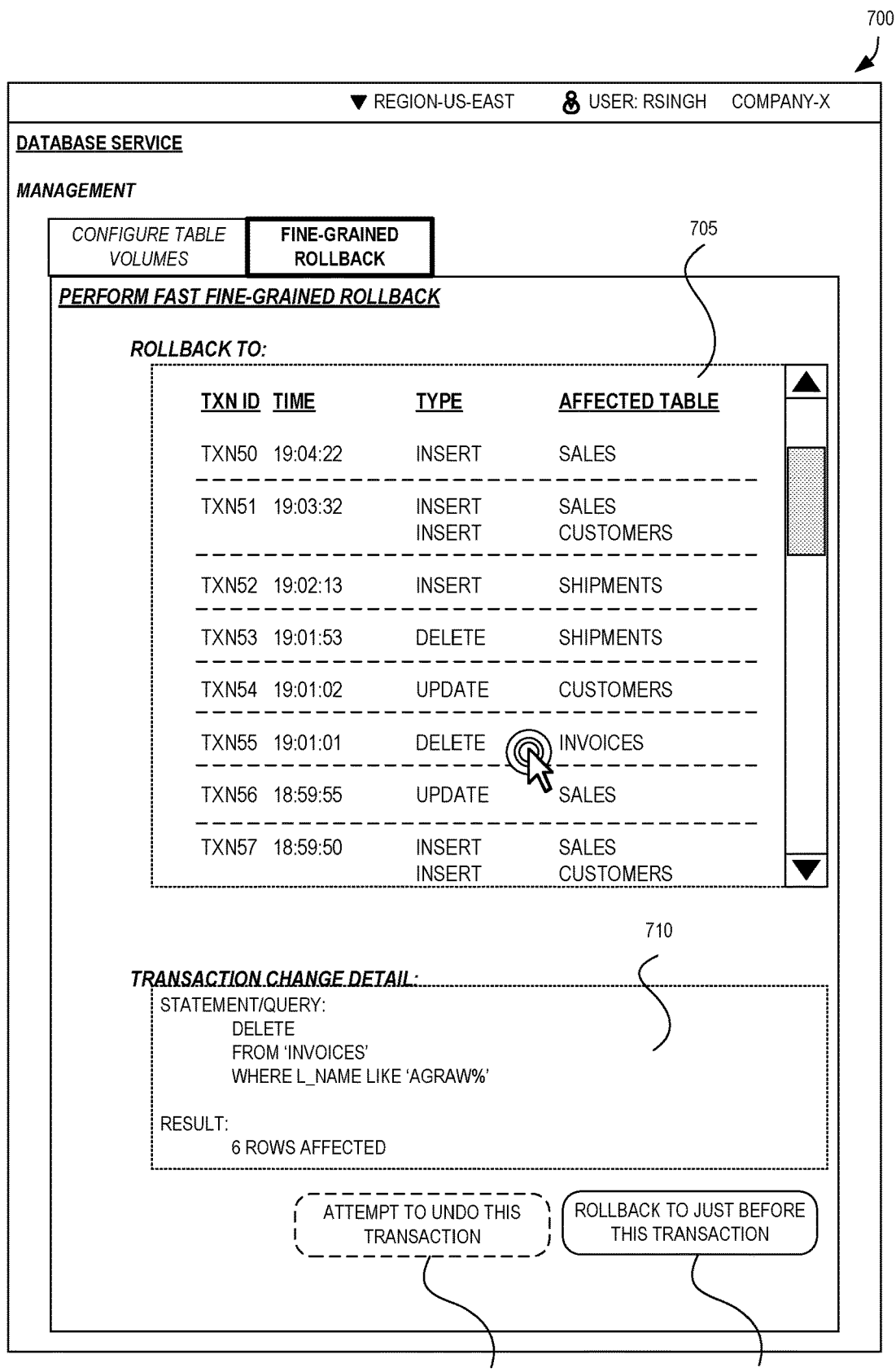
FIG. 7 illustrates an example user interface for obtaining user-selected fine-grained restore points to control fast granular point-in-time database restores in a multi-volume database environment according to some examples.

FIG. 7 illustrates an example user interface 700 for obtaining user-selected fine-grained restore points to control fast granular point-in-time database restores in a multi-volume database environment according to some examples.

Various database systems allow for point-in-time restores, whereby a user can select a particular time that they want a database restored "back" to, and the system does just that. In some example, this involves creating a new set of volumes as of that point in time, and switching to use those volumes instead of the "current" volumes. Likewise, a similar technique known as "flashback" can enable a same database to be modified through use of the binlog, e.g., by "undoing" particular binlog changes, such as via issuing commands that "undo" the changes reflected there. For example, an "insert" of some number of rows reflected in the binlog can be undone by issuing corresponding "delete" statements to delete those exact rows.

However, these techniques are not granular, as they typically require a user to select a particular point in time that they wish to "go back" to, and without much more detailed information, the user is left to guess what time is best. Thus, users may go "too far" back and eliminate good data that they wanted to remain, or may not go "far enough" back and thus the database still includes the user-deemed "bad" data or changes they were seeking to eliminate. Thus, these types of rollbacks require a lot of trial and error, or at the very least, a lot of detailed investigative work to determine when to rollback to.

Examples disclosed herein can use logical replay in a multi-volume database environment to allow more fine-grained rollbacks.

FIG. 7 shows an example user interface 700 (e.g., provided by a database service of a cloud provider network) allowing users to obtain transaction-specific details about the history of the database and to provide user-selected input to precisely control what point a database is to be rolled back to. As shown, a user interface element 705 may include a list of transactional changes made to the database over time (here shown with a timestamp of the transaction, and one or more indications of the types of changes involved and which tables were affected), and optionally upon selecting a change, the user may view more detailed information via another user interface element 710 about the particular transaction, e.g., what statement/query was run, what result occurred (e.g., a number of rows or columns affected), etc. Using this or a similar interface, users can identify particular transactions that they want to eliminate and/or preserve, and may then perform restorative actions, such as rolling back to just prior to a selected transaction (via user interface element 715, here a button) using the techniques disclosed herein, or even "undoing" a particular transaction (or set thereof) by user interface element 720 (e.g., a button) that can trigger performing of an "opposite" transaction based on binlog data. In some examples, this user interface can also allow a user to more intelligently provide a particular time value (e.g., a timestamp) indicating the point in which the user seeks for the rollback.

Accordingly, users can quickly and consistently rollback to a very precise point in time (e.g., based on transactional awareness) that is much more granular and user-friendly than current time-based approaches where a user must rollback to some particular time.

Figure 8:
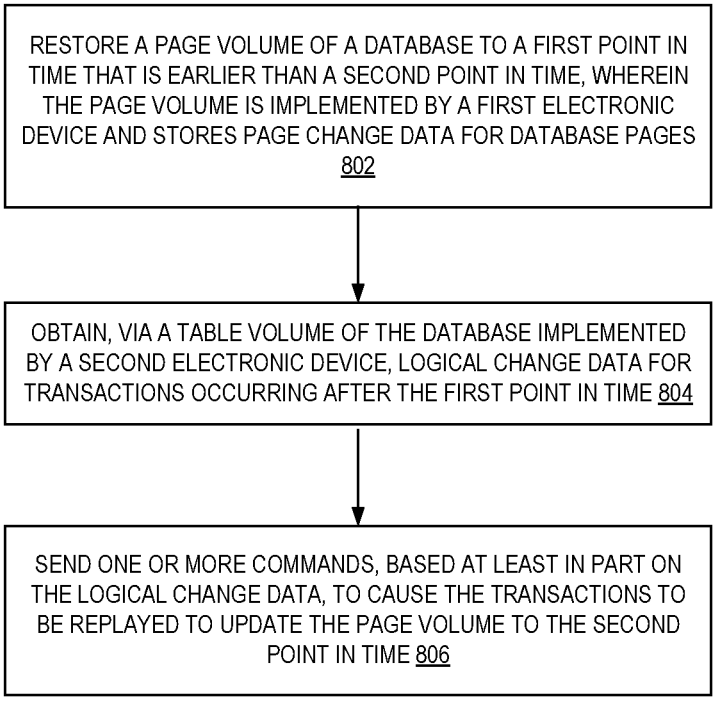
FIG. 8 is a flow diagram illustrating operations of a method for lossless database recovery using logical replay in a multi-volume database environment according to some examples.

FIG. 8 is a flow diagram illustrating operations 800 of a method for lossless database recovery using logical replay in a multi-volume database environment according to some examples. Some or all of the operations 800 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by a control plane component (e.g., recovery manager 510) of the other figures.

The operations 800 include, at block 802, restoring a page volume of a database to a first point in time that is earlier than a second point in time, wherein the page volume is implemented by a first electronic device and stores page change data for database pages (e.g., utilized by a database engine implemented by a third electronic device).

The operations 800 further include, at block 804, obtaining, via a table volume of the database implemented by a third electronic device, logical change data for transactions occurring after the first point in time.

The operations 800 further include, at block 806, sending one or more commands (e.g., to the database engine), based at least in part on the logical change data, to cause the transactions to be replayed (e.g., by the database engine) to update the page volume to the second point in time.

In some examples the operations 800 further include after the restoring, obtaining database coordinate information from the page volume indicative of a current state of the page volume, where obtaining the logical change data via the table volume comprises sending a request to the table volume that includes the database coordinate information. In some examples, the database coordinate information comprises a file identifier and an offset identifier, and in some examples, the database coordinate information comprises a transaction identifier.

In some examples the operations 800 further include prior to the restoring, detecting that the page volume is not usable; and selecting the first point in time. In some examples, detecting that the page volume is not usable includes determining that one or more entries of the page change data stored in the page volume cannot successfully be applied to one or more corresponding database pages, wherein an additional one or more entries of logical change data that correspond to the one or more entries of the page change data have been successfully stored in the table volume.

In some examples, the page change data stored by the page volume includes redo log records (and the page volume further stores one or more database pages that may be generated based on the redo log records), and in some examples, the logical change data stored by the table volume includes changelog records (e.g., binlog records).

In some examples the database is implemented by a database service in a multi-tenant cloud provider network, and wherein the database engine is part of a head node (e.g., implemented by a third electronic device) that itself is one of multiple nodes in a cluster utilizing the page volume and the table volume.

In some examples after the sending of the one or more commands to cause the transactions to be replayed to update the page volume to the second point in time, the page volume is completely updated to the second point in time without any loss of committed transaction data.

In some examples the restoring of the page volume of the database is performed for a first instance of the database in a first region, wherein the first instance previously had been a designated writer for the database prior to an unplanned failover where a second instance of the database in a second region became the designated writer; the database engine is part of the first instance; the table volume is part of the second instance; and the method further comprises designating the first instance to again become the designated writer for the database.

In some examples the operations 800 further include receiving a user-provided input value identifying a particular transaction or time value; and selecting the second point in time based on the user-provided input, whereby the database is restored, upon the replay of the transactions to update the page volume to the second point in time, to just prior to the particular transaction, just after the particular transaction, or to the time value.

Figure 9:
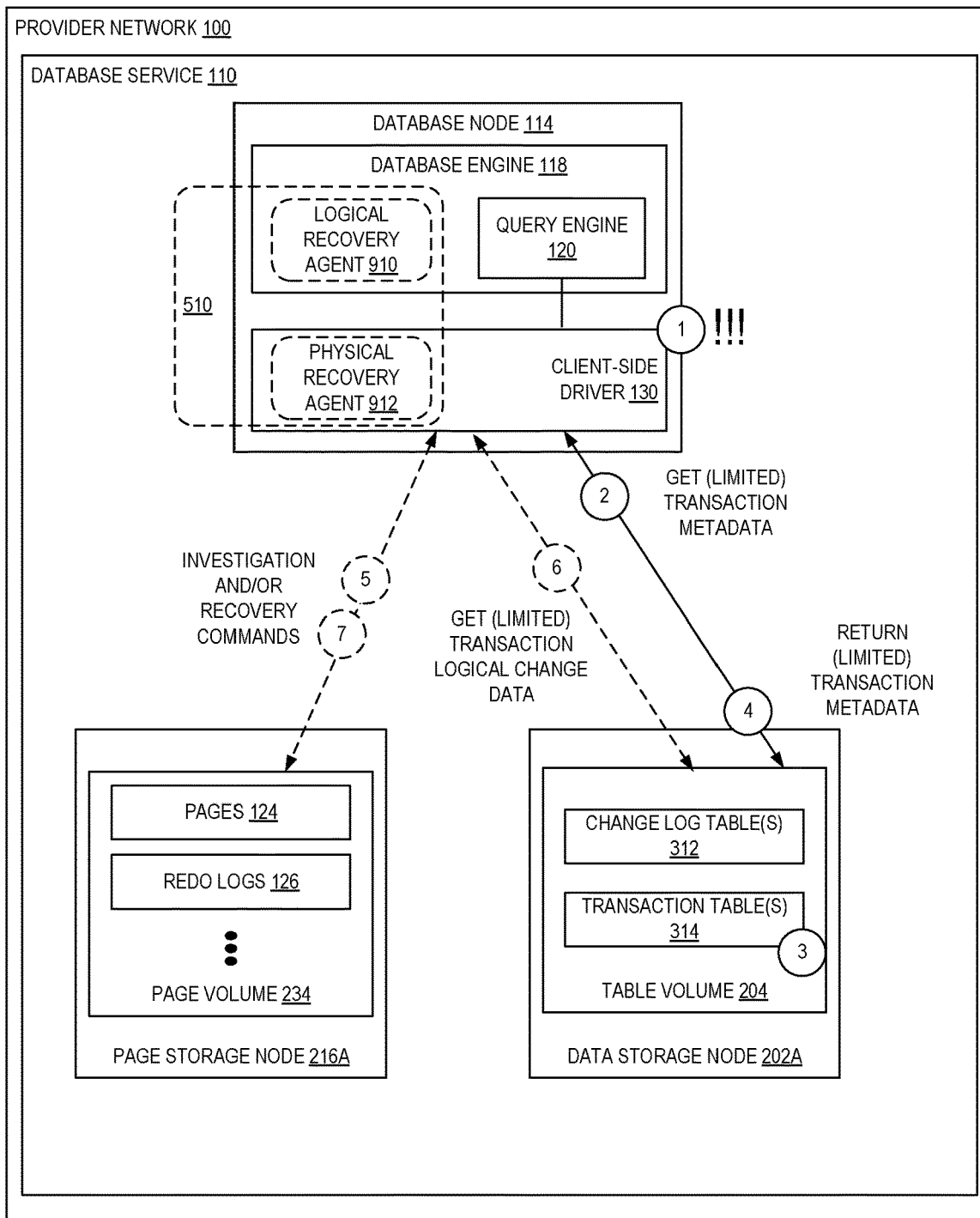
FIG. 9 illustrates an example system and operations for fast database recovery in a multi-volume database environment via transactional awareness according to some examples.

As indicated herein, recovery can be both more complete (e.g., by providing zero data loss recovery) and much faster than in single-volume systems. FIG. 9 illustrates an example system and operations for fast database recovery in a multi-volume database environment via transactional awareness according to some examples.

In single-volume systems, logical change data (e.g., binlogs) is typically written into a file, and when the file reaches a particular filesize, a new file is used until it becomes full, and so on. Thus, recovery using such data requires reading (at least) the last binlog file completely to iteratively analyze all transactions in that file to determine which did or did not actually get committed into the page volume. Thus, depending on which transactions did or did not get committed, the system may try to rollback or roll-forward. Accordingly, recovery time is a function of the size of the last file—e.g., 1 GB, 25 GB, etc.—as there is a need to read the file, parse its contents, and determine if each was committed or not. Thus, the speed of reading large files is somewhat slow, and recovery could be seriously slowed due to this factor, as reading the files and analyzing them as described could take tens of minutes, hours, etc.

In a multiple-volume environment disclosed herein, the table volumes 204 have awareness of the transactions (e.g., via transaction tables 314) and the actual logical change data (e.g., via changelogs stored in change log tables 312). Thus, in such systems recovery can be optimized as only the transaction metadata may be needed—the actual data may not be ever used, as it is initially important to just determine which all transactions have or have not been written into the database page volume 234. Thus, as the separate table volume 204 has awareness of transactions, and awareness of which transactions are committed and at what time, and what transactions are written into the last binlog file.

As shown, a recovery manager 510 may be implemented "local" to a database node 114, e.g., in the form of a physical recovery agent 912 that may be implemented as part of (or in conjunction with) the client-side driver 130 to handle the physical type recovery aspects (e.g., involving database pages and the page volume 234, interacting with the table volume 204 to obtain changelog data, etc.) as well as a logical recovery agent 910 that may be implemented as part of (or in conjunction with) the database engine 118 to handle logical and/or transactional type recovery aspects (e.g., involving transactional awareness, such as determining which transactions are committed and which are not, etc.). However, in other examples, the recovery manager 510 can be implemented separately, e.g., as part of a distinct control plane, and perform similar operations from that location.

Thus, at circle (1) the database node 114 (e.g., the client-side driver 130) may determine that a failure condition exists, etc., and will seek to perform a recovery. The database node 114 (e.g., via physical recovery agent 912) can interact with the table volume 204 at circle (2) to obtain transactional metadata (e.g., from the transaction tables 314 at circle (3)) that is returned at circle (4).

This transactional metadata may pertain to all transactions that are part of a particular binlog file, for example. While that binlog file may be extremely large in size (e.g., multiple gigabytes or more), the transactional metadata may be much, much smaller—e.g., a small amount of data for only a few number of transactions. With this data, the recovery manager 510 (e.g., via logical recovery agent 910) can ensure (e.g., via investigative commands at circle (5)) that each listed transaction was in fact written into the page storage nodes 216A (and table volume 204), and if not, perform replays of these transactions (e.g., using binlog data from the change log tables 312 obtained at circle (6)) to update the database page volume 234 at circle (7). Accordingly, instead of recovery time being minutes or hours or more (e.g., 40 minutes), in some examples recovery can be performed much faster, such as in single-digits of seconds (e.g., 1.2 seconds).

In some examples, this process can be further optimized. As the table volume 204 may have information indicative of what transactions have already been committed into the page storage nodes 216A and the change log tables 312, in some examples the recovery manager 510 only needs to obtain metadata for just those transactions that are not already known (per the transaction tables 314) as being fully committed. For example, assuming a "last" binlog file for a database has hundreds of transactions, instead of returning transactional metadata for all of these transactions, the data of the transactional table(s) 314 can be analyzed to determine that only two of these transactions are questionable (due to not being marked as fully recorded). In some examples, the durable LSN (VDL) of a volume may be known by the recovery manager 510 and/or data storage node 202A, as a commit into the table volume 204 may point to a corresponding transaction in the database page volume 234, and the VDL may be moved to point to a latest such set of committed entries. Thus, as the fully-committed transactions may already be known—via just data in the table volume 204—only a much smaller number of transactions need to be investigated (e.g., those entries in the table volume 204 that do not have a recorded LSN for the corresponding page volume entry), and recovery time can potentially be further reduced, such as down to milliseconds.

In this example, a same database instance (e.g., combination of database node(s) 114 and the page and table volumes) is recovered. However, other types of recovery can be accommodated in various examples using these techniques, e.g., by failing over to a new database instance (e.g., obtaining new database node(s) and using different, but corresponding, page and table volumes). As another example, another type of recovery can include promoting another database node 114 in a cluster to be a writer node (instead of a reader node).

Figure 10:
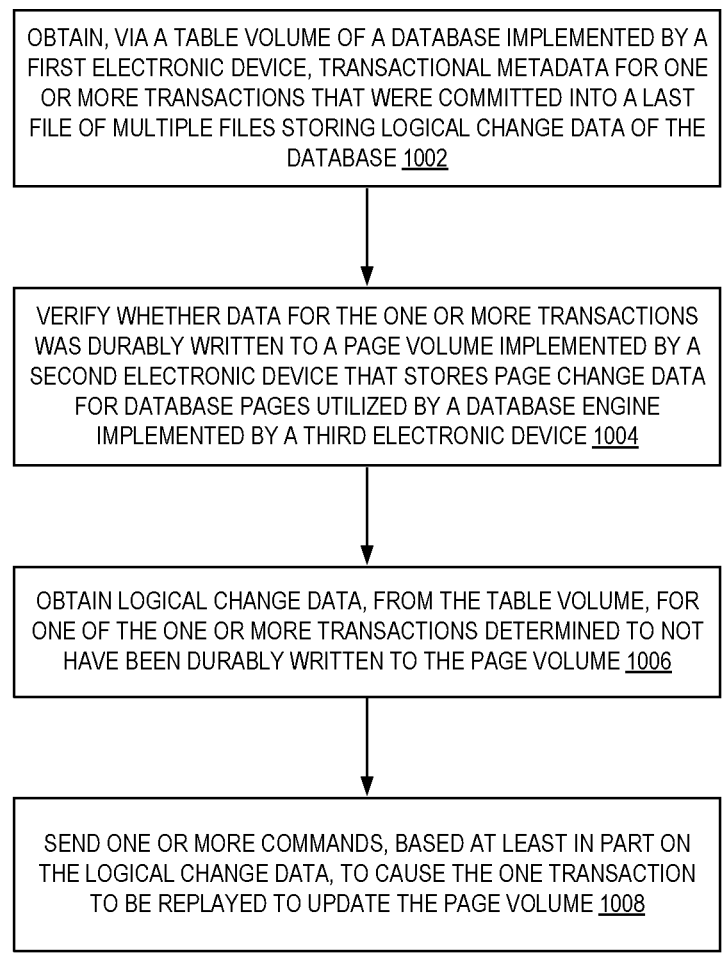
FIG. 10 is a flow diagram illustrating operations of a method for fast database recovery in a multi-volume database environment via transactional awareness according to some examples.

FIG. 10 is a flow diagram illustrating operations 1000 of a method for fast database recovery in a multi-volume database environment via transactional awareness according to some examples. Some or all of the operations 1000 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1000 are performed by a control plane component (e.g., recovery manager 510) of the other figures.

The operations 1000 include, at block 1002, obtaining, via a table volume of a database implemented by a first electronic device, transactional metadata for one or more transactions that were committed into a last file of multiple files storing logical change data of the database.

The operations 1000 further include, at block 1004, verifying whether data for the one or more transactions was durably written to a page volume implemented by a second electronic device that stores page change data for database pages utilized by a database engine implemented by a third electronic device.

The operations 1000 further include, at block 1006, obtaining logical change data, from the table volume, for one of the one or more transactions determined to not have been durably written to the page volume.

The operations 1000 further include, at block 1008, sending one or more commands (e.g., to the database engine), based at least in part on the logical change data, to cause the one transaction to be replayed (e.g., by the database engine) to update the page volume.

In some examples, the obtaining of the transactional metadata includes collecting transactional metadata for all transactions that were committed into the last file.

In some examples, the obtaining of the transactional metadata includes collecting transactional metadata for only those transactions, of the transactions committed into the last file, that are not marked as being durably committed within a transaction table of the table volume.

In some examples, the obtained transactional metadata does not include actual logical change data associated with the one or more transactions; the obtained transactional metadata is stored in a first data structure of the table volume; and the actual logical change data associated with the one or more transactions is stored in a second data structure of the table volume.

In some examples, the obtaining of the transactional metadata, the verifying, the obtaining of the logical change data, and the replay of at least the one transaction to update the page volume occurs in an amount of time, the amount of time being less than ten seconds. In some examples, the amount of time is less than one second.

In some examples, the database is implemented by a database service in a multi-tenant cloud provider network, and wherein the database service is communicatively coupled to the table volume and the database page volume via one or more network connections.

In some examples, the page change data stored by the page volume includes redo log records, and the page volume further stores database pages. In some examples, the logical change data stored by the table volume includes changelog records (e.g., binlog records, WAL records).

In some examples, a size of the obtained transactional metadata is less than ten percent of the size of the corresponding file, wherein the multiple files storing logical change data of the database are binlog files.

In some examples, the transactional metadata, for at least one of the one or more transactions, includes a commit time of the transaction, a transaction identifier of the transaction, or a log sequence number (LSN) associated with the table volume. In some examples, this transactional metadata includes the transaction identifier and the LSN.

Figure 11:
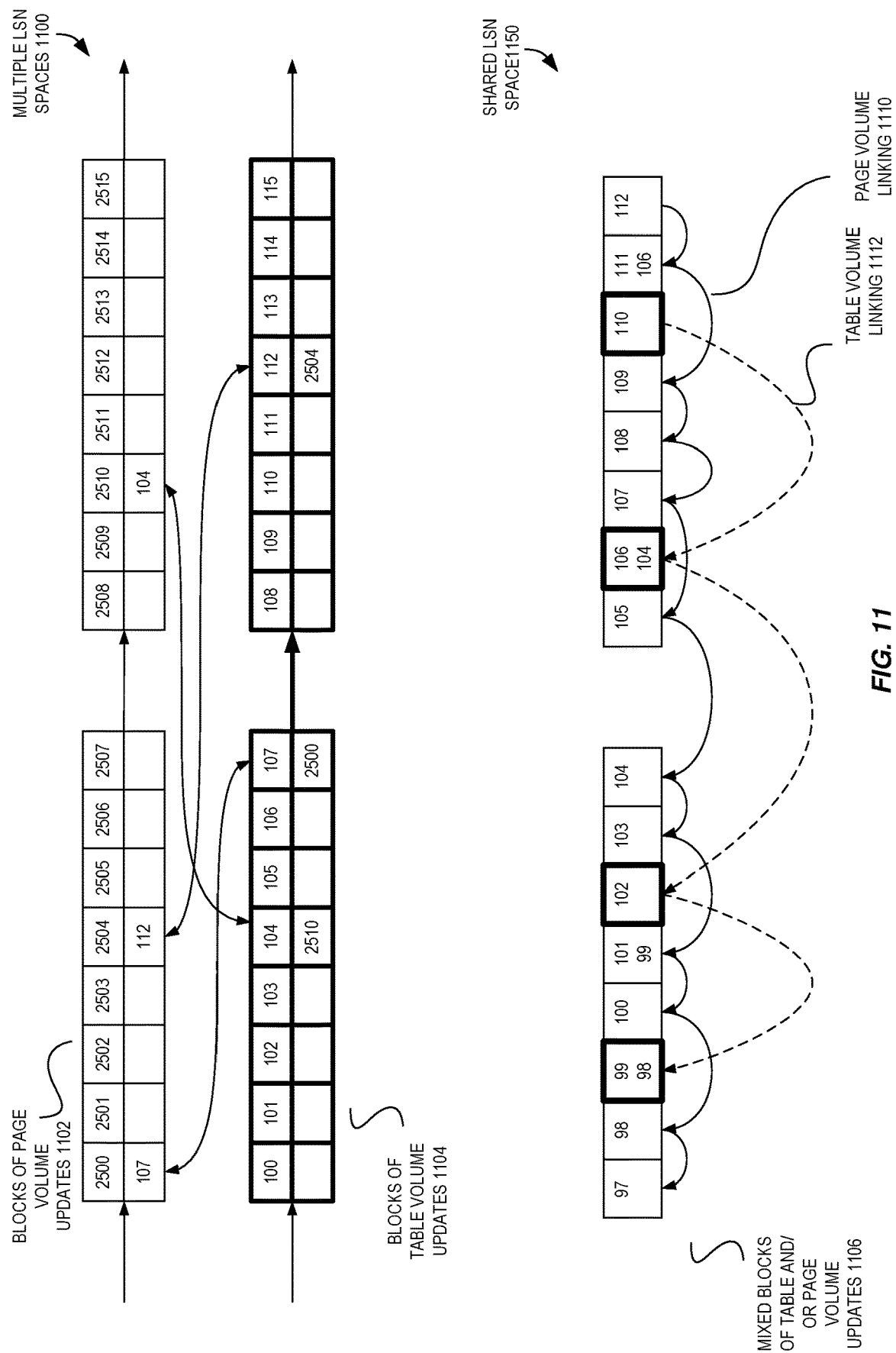
FIG. 11 illustrates example log blocks in a multi-log storage number (LSN) space configuration and in a single-LSN space configuration in a multi-volume database environment according to some examples.

In multi-volume configurations, the durable writing of records going into these volumes needs to be tracked for the sake of ensuring consistency. This may include assigning log storage numbers (LSNs) to these updates. FIG. 11 illustrates example log blocks in a multi-log storage number (LSN) space configuration and in a single-LSN space configuration in a multi-volume database environment according to some examples.

In some examples, LSNs may be assigned to page volume and table volume updates (where an "update" may correspond to a log entry that is written, whether it be a redo log or binlog entry). As the page volume and the table volume are two separate volumes, the log records going into each of them needs an independent LSN. These LSNs can either come from different LSN spaces or they can come from a same LSN space. If they come from a same LSN space, it may be the case that the linking (e.g., from one table volume update to a previous, from one page volume update to a previous) needs to be independent.

Thus, as shown at 1100, multiple LSN spaces can be used, e.g., one LSN space for page volume updates (here, shown as LSNs 2500-2515) and one LSN space for table volume updates (here, shown as LSNs 100-115). As shown, a grouping of logs (or "updates") may be combined together into a block of updates, which could be atomically committed for performance reasons. Thus, there are blocks 1102 of page volume updates and blocks 1104 of table volume updates.

As shown, a page volume update/log may include a pointer to a corresponding table volume update, and/or a table volume update/log may include a pointer to a corresponding page volume update, thus providing a "chain." For example, page volume update with LSN 2500 may include a pointer to table volume update 107. Such pointers can allow for efficient understanding of whether both updates of a transaction have been committed, and allow for quickly finding the "other" log/update if needed.

However, managing two different LSN spaces can introduce overhead in terms of added complexities, e.g., determining which entries are committed (or not) can be tricky. Thus, a single "shared" LSN space can be used, such as shown at 1150, where "mixed" blocks 1106 of table or page volume updates and share a common LSN space (e.g., partially shown as 97-112), where table volume updates are shown with bold borders and page volume updates are shown with thin-lined borders. In this case, separate links are stored for log updates of the different volume types, shown as table volume linking 1112 and page volume linking 1110, allowing for traversal of the updates of a common volume type.

Also, ones of the updates can reflect corresponding commits. As shown, a commit history can be maintained for transactions using trios (e.g., three-groupings) of ones of these updates. One example transaction commit may be made up of a page volume update at block 98 (e.g., a "prepare to commit" update), a table volume update at block 99 (e.g., a "commit" update, which points back to the corresponding "prepare to commit" update of block 98), and another page volume update at block 101 (e.g., a "commit" update, which points back to the corresponding table volume "commit" at block 98). Thus, using these two update backlinks (101 to 99, and 99 to 98), the important transactional commit events can be easily found. Such systems can be used at least partially to assist in guaranteeing consistency of writes.

Figure 12:
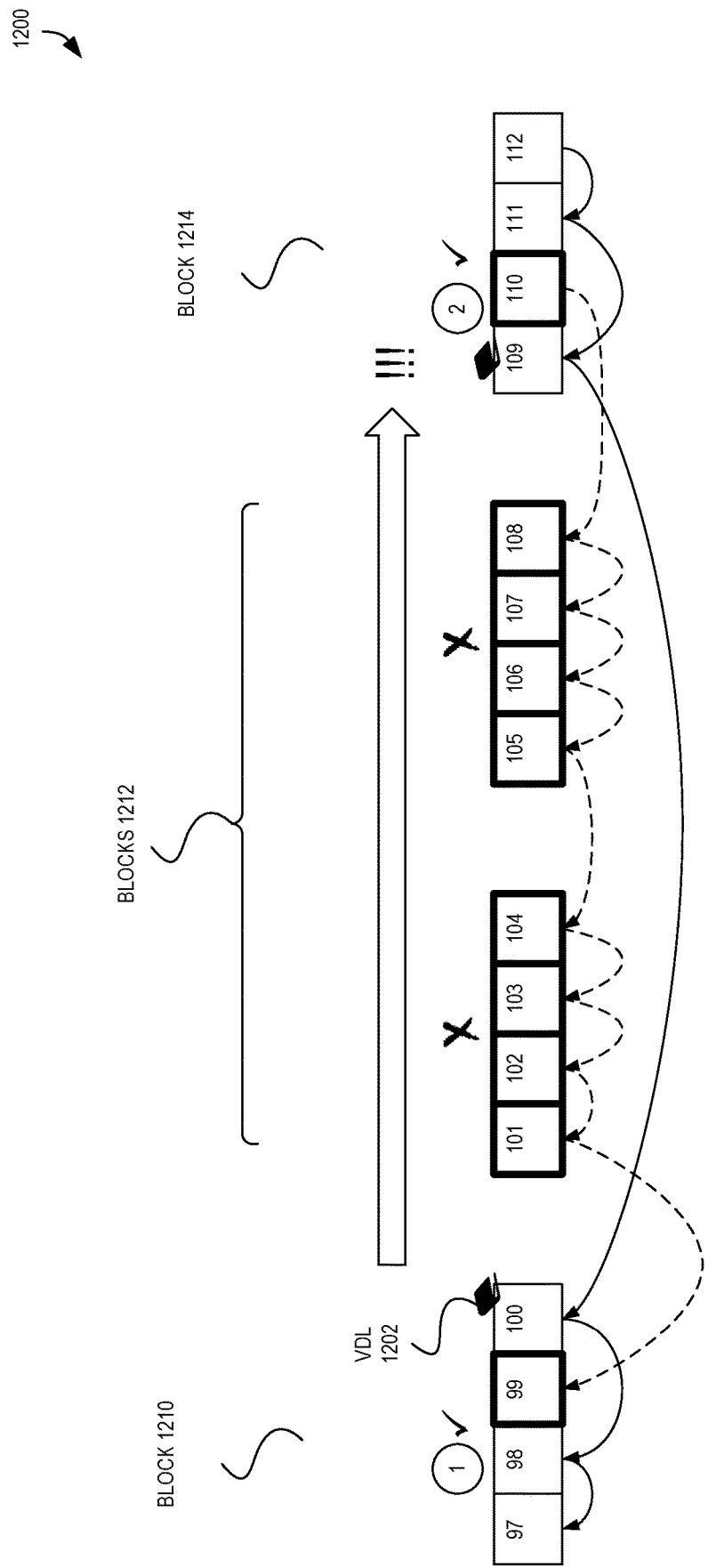
FIG. 12 illustrates example problematic VDL movement in a single-LSN space configuration in a multi-volume database environment according to some examples.

FIG. 12 illustrates example system 1200 with problematic VDL movement in a single-LSN space configuration in a multi-volume database environment according to some examples. In this example, we assume that a first block 1210 of log updates are atomically and durably persisted to storage as reflected by circle (1) and the associated checkmark icon, and thus a VDL pointer 1202 (pointing to a latest verified durable update) is set to the last update of the block is set to point to the page volume update corresponding to LSN 100.

In this example, a next set of multiple blocks 1212 are organized, assigned LSN values, and attempted to be atomically and durably written, but it may be the case that a subsequent block 1214 is actually atomically and durably written first. In this case, a simple system may attempt to update the VDL pointer to one of these updates, e.g., log update 109 for a page volume update, as it points back to another log update (update with LSN 100) that has already been durably committed. Thus, though it is correct that all previous page volume updates have been in fact durably committed, it is not the case that all previous updates (here, several table volume updates) have been durably committed. Thus, if the VDL would be adjusted at circle (2) to point to this update 109, that would be incorrect and can lead to problems, as a VDL is meant to indicate that everything beforehand in the LSN space has been durably stored, either by a page volume or table volume, and thus all those entries have gone into their own respective storage. For example, during a recovery, the middle table volume updates (from LSNs 101-108) would be missed as they were not durable yet.

Figure 13:
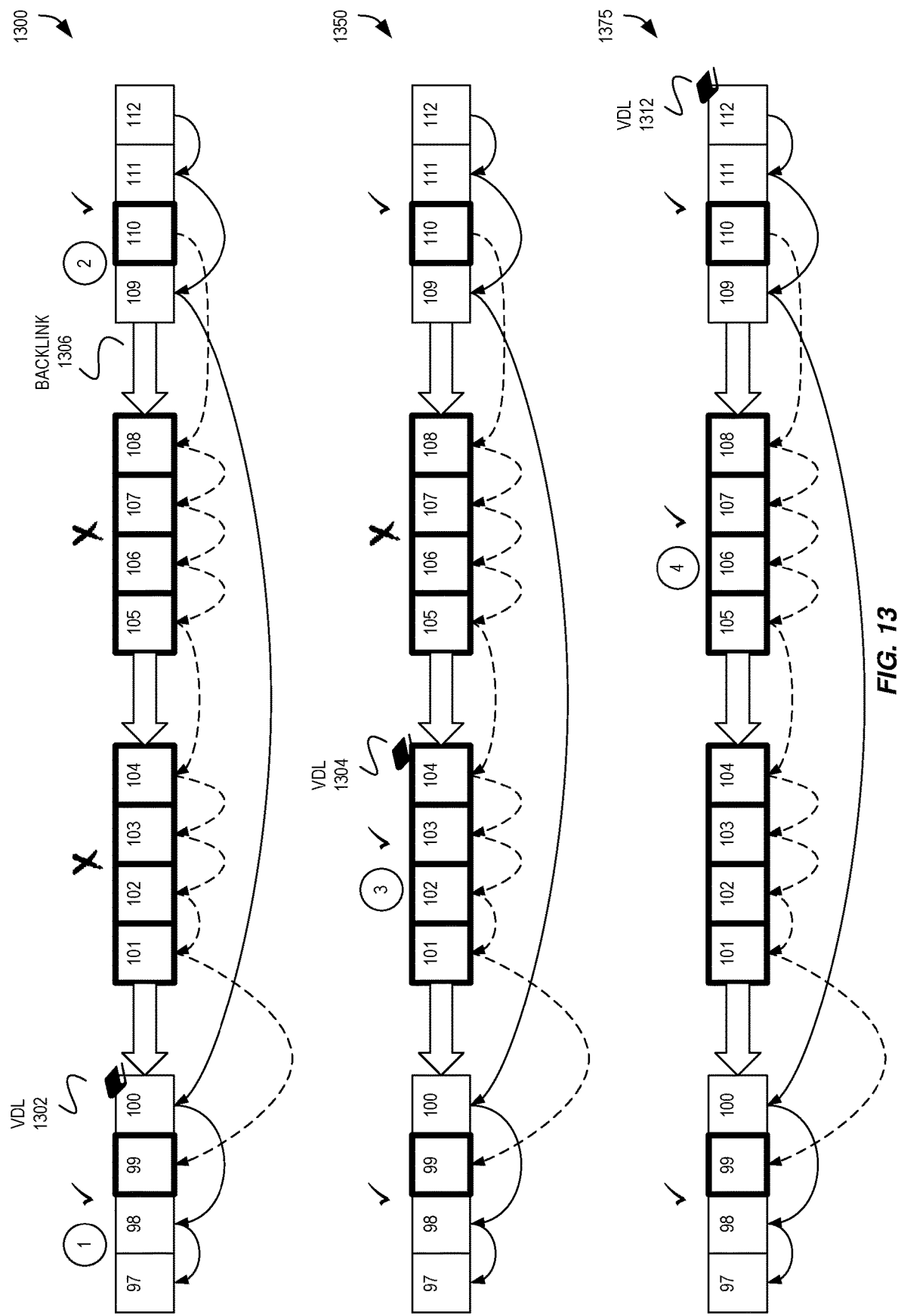
FIG. 13 illustrates an example technique for consistent VDL movement in a single-LSN space configuration in a multi-volume database environment according to some examples.

To address this issue, a block backlinking technique can be utilized. FIG. 13 illustrates an example technique for consistent VDL movement in a single-LSN space configuration in a multi-volume database environment according to some examples.

As indicated earlier, LSNs attached to log updates can utilize backlinking, where every LSN points to a previous LSN for same volume. For example, all table volume updates point to previous table volume updates, and all page volume updates may point to previous page volume updates. This backlinking can be useful for recovery. For example, it may be the case that a particular log update 104 wasn't written for some reason. Via backlinking, it is possible to trace back through the LSN space, e.g., verify that update 105 was written, follow the backlink to update 104, and upon trying to read update 104, it will not be seen and thus a determination can be made that it was not written. With further investigation, it can be determined that the system is VDL up to a previous update, e.g., update 101. Such backlinking solves the problem of non-contiguous LSNs within a volume type; while they may be monotonically increasing, many are not contiguous. Accordingly, if any data is missing as we backlink, it is know that recovery is to be done up to that point.

Turning back to FIG. 13, to guarantee that everything prior to a VDL update is persisted into its respective storage, block backlinking is used. In some examples, every block of updates (e.g., to be atomically and durable committed together into one or multiple volumes) can be backlinked, either at the time of creation of the block, upon the atomic and durable writing of the block, or at another time. Such block backlinks can allow for easier and faster visibility into potentially missing "earlier" LSNs where the logs haven't been durable written, which allows for more efficient VDL movement.

As shown at 1300, the VDL 1302 may be set to a last update in a block upon the block being atomically and durably committed at circle (1)—we assume all prior blocks have been also for ease of explanation. Next, at circle (2), the fourth block has been atomically and durably committed; however, upon following its block backlink 1306 back to the third block, it can be quickly determined that ones of this block of updates have not yet been committed, and thus VDL movement cannot occur!

Next, at circle (3) at 1350, the second block is atomically and durably committed, and upon following the backlink back to the first block, we can see that this block is committed and we reach the old VDL 1302. Thus, the VDL can be moved to VDL 1304, which points to the last update in the second block.

Next, at 1375 and circle (4), the third block is atomically and durably committed, and via backlinking, it can be determined that the chain of fully-committed updates reaches all the way to the end of the fourth block, so the VDL can be moved to VDL 1312. Accordingly, via this backlinking and attempting to perform VDL movement after the persisting of a block, no "hole" of missing updates will exist.

Such techniques can beneficially be used for even more numbers of volumes, e.g., three volumes, four volumes, or the like, and this can ensure that all volumes are consistent. For example, in some examples a third volume could be used for temporary storage (e.g., so the database engine can store temp tables), and these could be written into another volume. Using this same approach, all volumes will remain consistent.

Accordingly, by not moving the VDL until all contiguous blocks are persisted, this guarantees that all LSNs are all consistently written.

Figure 14:
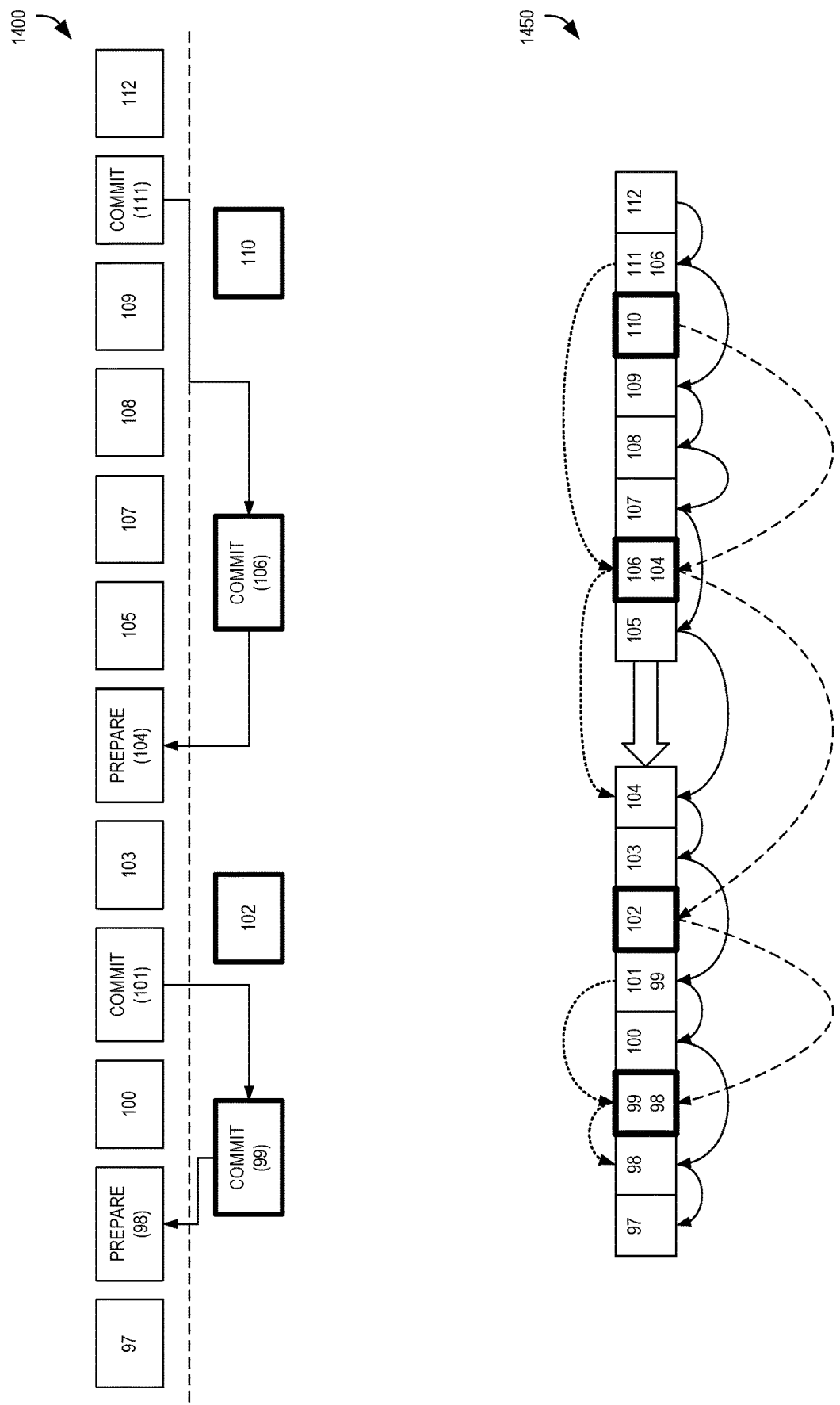
FIG. 14 illustrates exemplary multi-volume log updates with cross-volume two-phase commit tracking in a single-LSN space configuration according to some examples.

FIG. 14 illustrates exemplary multi-volume log updates with cross-volume two-phase commit tracking in a single-LSN space configuration according to some examples. As introduced earlier, log blocks can track multiple volume commits. For example, the set of log blocks at 1450 shows a trio of updates pertaining to a same transaction, which are also represented above at 1400. Thus, a "prepare" update to a page volume at LSN 98 can be pointed to by a "commit" entry in the table volume at LSN 99, and this update can be pointed to by a "commit" entry in the page volume (e.g., committing the commit of the table volume) at LSN 101.

In some examples, this scheme assists fast recovery, e.g., if we see that the update with LSN 99 is committed, we know that the corresponding update with LSN 98 in the page volume is committed, so we don't have to return that transaction to the engine for replay as part of recovery.

Figure 15:
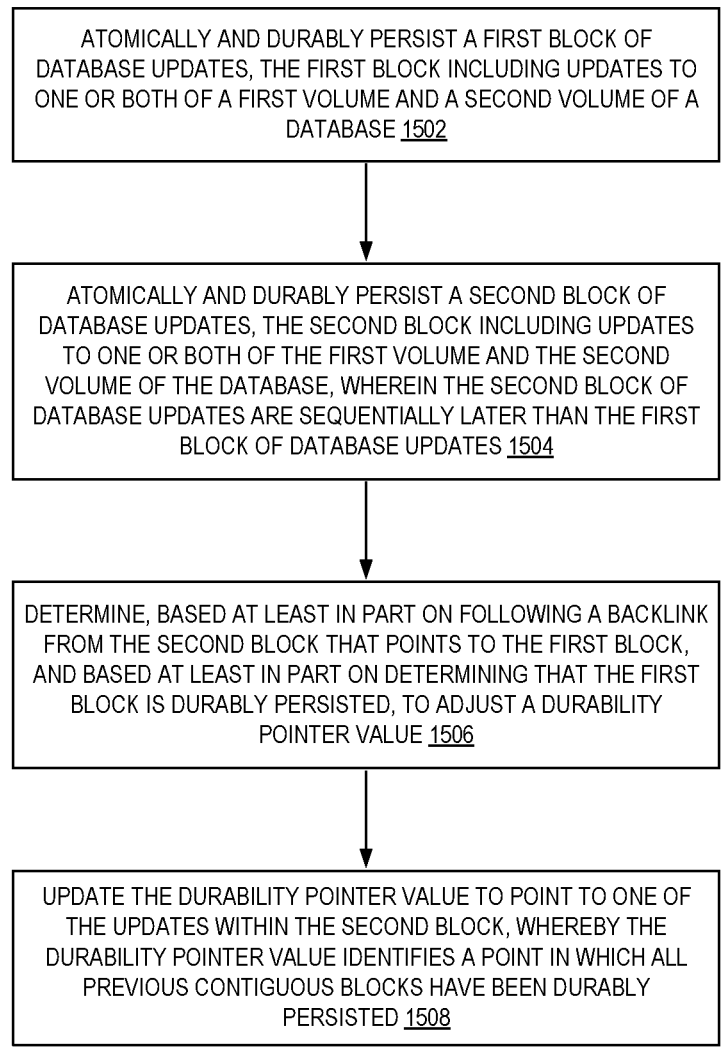
FIG. 15 is a flow diagram illustrating operations of a method for volume durable log storage number movement in a multi-volume database environment according to some examples.

FIG. 15 is a flow diagram illustrating operations 1500 of a method for volume durable log storage number movement in a multi-volume database environment according to some examples. Some or all of the operations 1500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1500 are performed by a control plane component (e.g., recovery manager 510) and/or client-side driver 130 of the other figures.

The operations 1500 include, at block 1502, atomically and durably persisting a first block of database updates, the first block including updates to one or both of a first volume and a second volume of a database.

The operations 1500 further include, at block 1504, atomically and durably persisting a second block of database updates, the second block including updates to one or both of the first volume and the second volume of the database. In some examples, the second block of database updates are sequentially later than the first block of database updates.

The operations 1500 further include, at block 1506, determining, based at least in part on following a backlink from the second block that points to the first block, and based at least in part on determining that the first block is durably persisted, to adjust a durability pointer value.

The operations 1500 further include, at block 1508, updating the durability pointer value to point to one of the updates within the second block, whereby the durability pointer value identifies a point in which all previous contiguous blocks have been durably persisted.

In some examples, prior to the updating, the durability pointer value pointed to one of the updates within the first block.

In some examples, prior to the updating, the durability pointer value pointed to one of the updates within a third block. In some examples, each update of the first block has a unique log sequence number (LSN) within a first range of values; each update of the second block also has a unique LSN within a second range of values; each update of the third block also has a unique LSN within a third range of values; and all of the LSNs are in a single LSN space. In some examples, the third range of values are smaller than the first range of values; and the first range of values are smaller than the second range of values.

In some examples, the first block includes updates to one or both of the first volume and the second volume, and further includes one or more updates to a third volume of the database.

In some examples, the operations 1500 further include utilizing the durability pointer value as part of a database recovery process. In some examples, utilizing the durability pointer value as part of the database recovery process includes eliminating from a durability verification process those transactions corresponding to updates from blocks that are prior to the update identified by the durability pointer value.

In some examples, the first block of database updates includes at least a first, second, third, and fourth database update, and wherein the first block further includes: a first pointer from the first database update back to the second database update, wherein the first database update and the second database update both involve the first volume; and a second pointer from the third database update back to the fourth database update, wherein the third database update and the fourth database update both involve the second volume.

In some examples, the first block further includes a cross-volume link (e.g., a pointer between an update from a first volume and a corresponding update from a second volume). For example, the cross-volume link can be between either the first database update or the second database update, and either the third database update or the fourth database update. The cross-volume link can be used to connect updates that commit a transaction in distinct volumes, and thereafter used during recovery processes to quickly identify which updates have (or have not) been durably persisted in both volumes.

In some examples, the database is implemented by a database service in a multi-tenant cloud provider network, and wherein the first volume and the second volume are both used by a database engine. In some examples, the first volume stores page change data, the page change data comprising redo log records; and the second volume stores logical change data, the logical change data including transactional metadata and binlog records.

Figure 16:
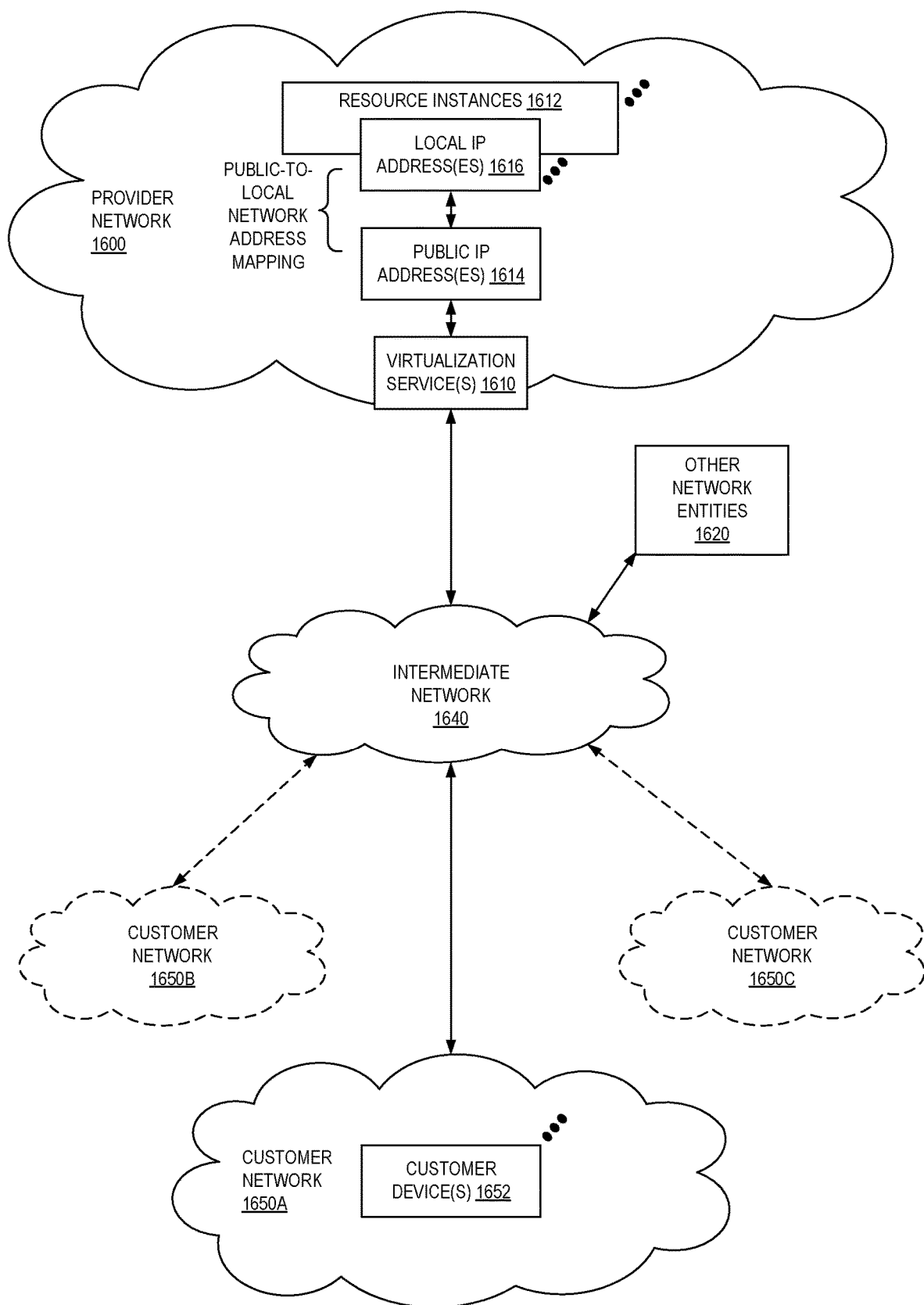
FIG. 16 illustrates an example provider network environment according to some examples.

FIG. 16 illustrates an example provider network (or "service provider system") environment according to some examples. A provider network 1600 can provide resource virtualization to customers via one or more virtualization services 1610 that allow customers to purchase, rent, or otherwise obtain instances 1612 of virtualized resources, including but not limited to computation and storage resources, implemented on devices within the provider network or networks in one or more data centers. Local Internet Protocol (IP) addresses 1616 can be associated with the resource instances 1612; the local IP addresses are the internal network addresses of the resource instances 1612 on the provider network 1600. In some examples, the provider network 1600 can also provide public IP addresses 1614 and/or public IP address ranges (e.g., Internet Protocol version 4 (IPv4) or Internet Protocol version 6 (IPv6) addresses) that customers can obtain from the provider 1600.

Conventionally, the provider network 1600, via the virtualization services 1610, can allow a customer of the service provider (e.g., a customer that operates one or more customer networks 1650A-1650C (or "client networks") including one or more customer device(s) 1652) to dynamically associate at least some public IP addresses 1614 assigned or allocated to the customer with particular resource instances 1612 assigned to the customer. The provider network 1600 can also allow the customer to remap a public IP address 1614, previously mapped to one virtualized computing resource instance 1612 allocated to the customer, to another virtualized computing resource instance 1612 that is also allocated to the customer. Using the virtualized computing resource instances 1612 and public IP addresses 1614 provided by the service provider, a customer of the service provider such as the operator of the customer network(s) 1650A-1650C can, for example, implement customer-specific applications and present the customer's applications on an intermediate network 1640, such as the Internet. Other network entities 1620 on the intermediate network 1640 can then generate traffic to a destination public IP address 1614 published by the customer network(s) 1650A-1650C; the traffic is routed to the service provider data center, and at the data center is routed, via a network substrate, to the local IP address 1616 of the virtualized computing resource instance 1612 currently mapped to the destination public IP address 1614. Similarly, response traffic from the virtualized computing resource instance 1612 can be routed via the network substrate back onto the intermediate network 1640 to the source entity 1620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1600; a customer can then assign their allocated public IP addresses to particular resource instances allocated to the customer. These public IP addresses can be referred to as customer public IP addresses, or simply customer IP addresses. Instead of being assigned by the provider network 1600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 17:
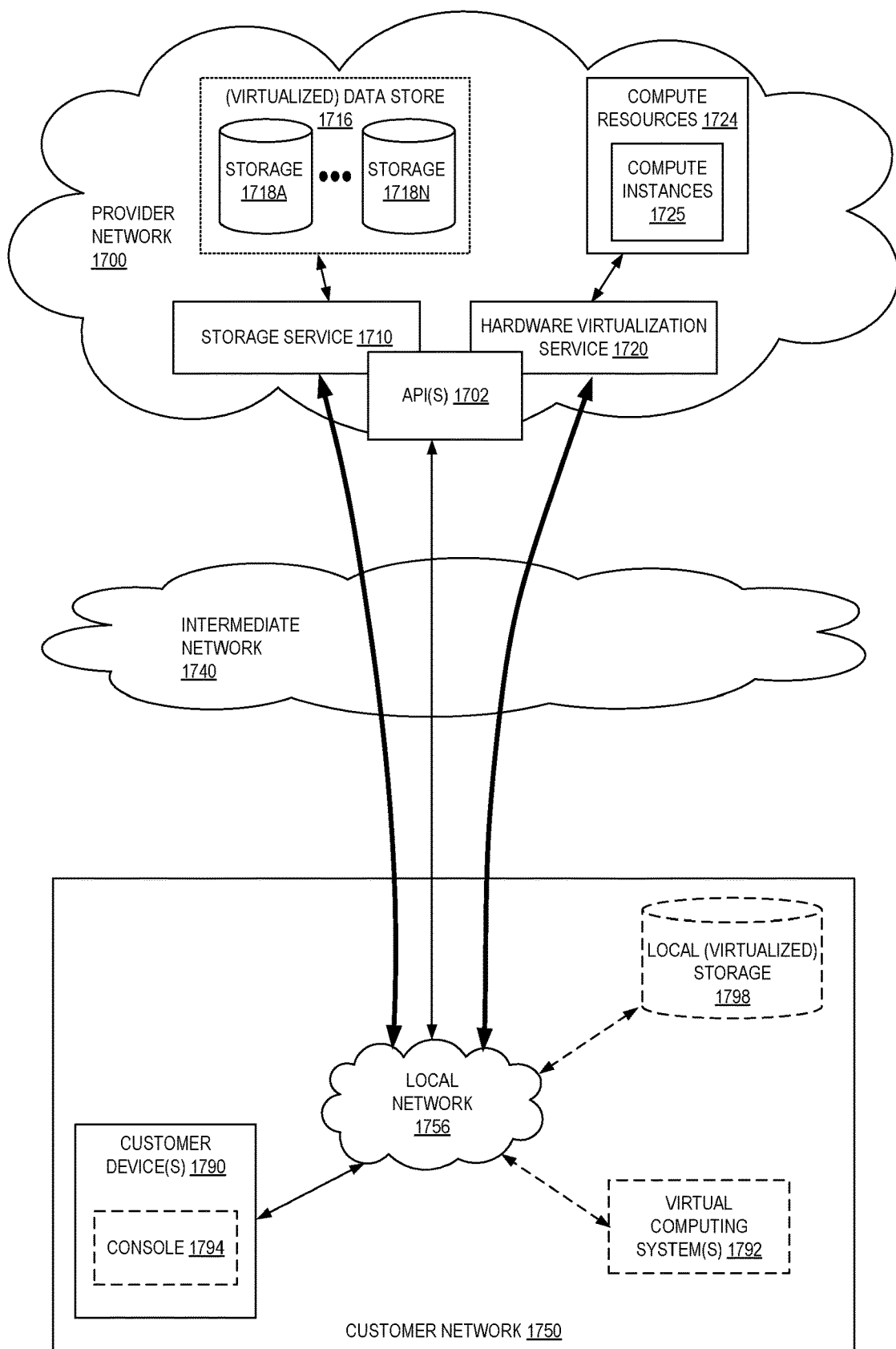
FIG. 17 is a block diagram of an example provider network that provides a storage service and a hardware virtualization service to customers according to some examples.

FIG. 17 is a block diagram of an example provider network environment that provides a storage service and a hardware virtualization service to customers, according to some examples. A hardware virtualization service 1720 provides multiple compute resources 1724 (e.g., compute instances 1725, such as VMs) to customers. The compute resources 1724 can, for example, be provided as a service to customers of a provider network 1700 (e.g., to a customer that implements a customer network 1750). Each computation resource 1724 can be provided with one or more local IP addresses. The provider network 1700 can be configured to route packets from the local IP addresses of the compute resources 1724 to public Internet destinations, and from public Internet sources to the local IP addresses of the compute resources 1724.

The provider network 1700 can provide the customer network 1750, for example coupled to an intermediate network 1740 via a local network 1756, the ability to implement virtual computing systems 1792 via the hardware virtualization service 1720 coupled to the intermediate network 1740 and to the provider network 1700. In some examples, the hardware virtualization service 1720 can provide one or more APIs 1702, for example a web services interface, via which the customer network 1750 can access functionality provided by the hardware virtualization service 1720, for example via a console 1794 (e.g., a web-based application, standalone application, mobile application, etc.) of a customer device 1790. In some examples, at the provider network 1700, each virtual computing system 1792 at the customer network 1750 can correspond to a computation resource 1724 that is leased, rented, or otherwise provided to the customer network 1750.

From an instance of the virtual computing system(s) 1792 and/or another customer device 1790 (e.g., via console 1794), the customer can access the functionality of a storage service 1710, for example via the one or more APIs 1702, to access data from and store data to storage resources 1718A-1718N of a virtual data store 1716 (e.g., a folder or "bucket," a virtualized volume, a database, etc.) provided by the provider network 1700. In some examples, a virtualized data store gateway (not shown) can be provided at the customer network 1750 that can locally cache at least some data, for example frequently accessed or critical data, and that can communicate with the storage service 1710 via one or more communications channels to upload new or modified data from a local cache so that the primary store of data (the virtualized data store 1716) is maintained. In some examples, a user, via the virtual computing system 1792 and/or another customer device 1790, can mount and access virtual data store 1716 volumes via the storage service 1710 acting as a storage virtualization service, and these volumes can appear to the user as local (virtualized) storage 1798.

While not shown in FIG. 17, the virtualization service(s) can also be accessed from resource instances within the provider network 1700 via the API(s) 1702. For example, a customer, appliance service provider, or other entity can access a virtualization service from within a respective virtual network on the provider network 1700 via the API(s) 1702 to request allocation of one or more resource instances within the virtual network or within another virtual network.

Illustrative Systems

Figure 18:
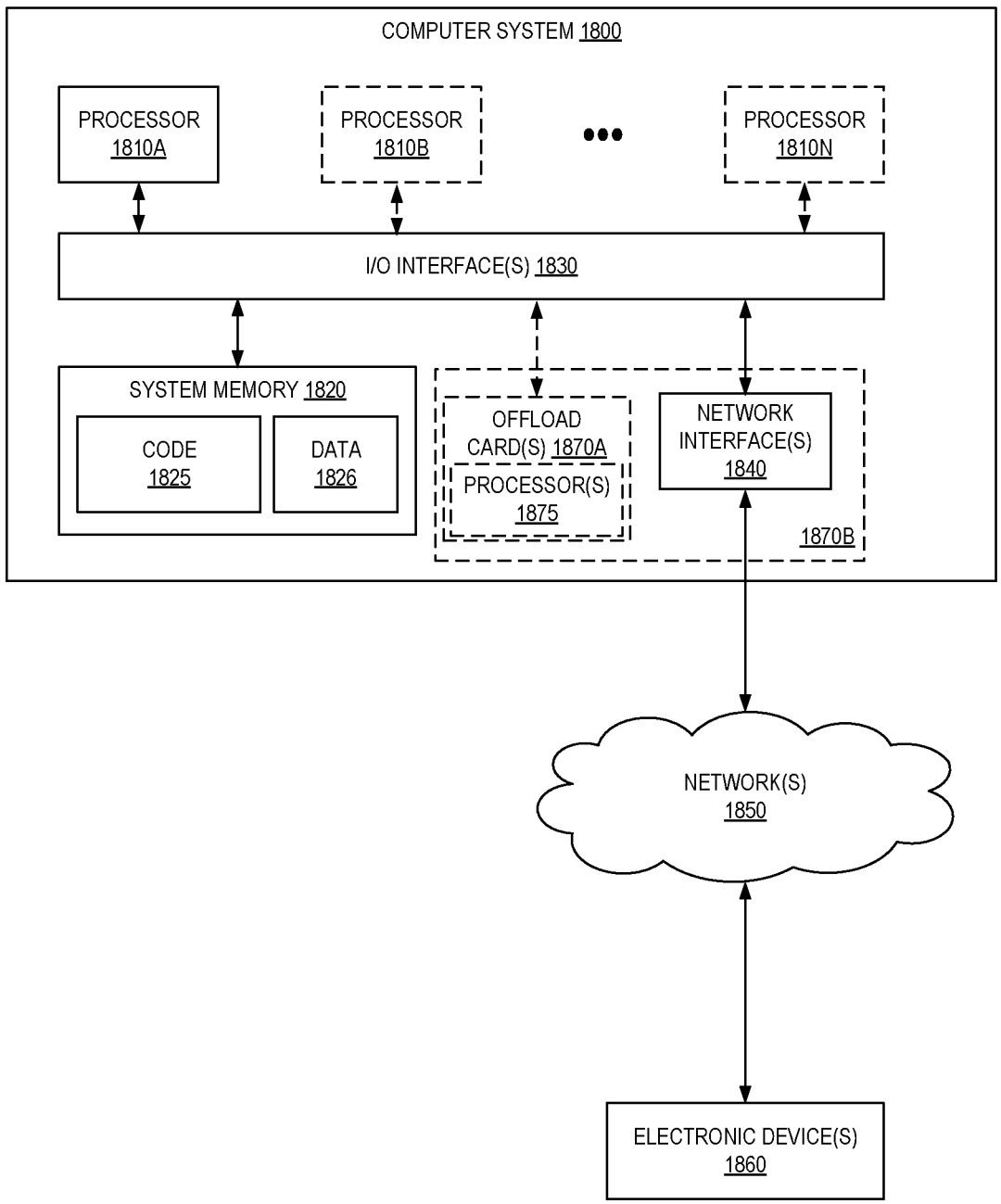
FIG. 18 is a block diagram illustrating an example computer system that can be used in some examples.

In some examples, a system that implements a portion or all of the techniques described herein can include a general-purpose computer system, such as the computer system 1800 illustrated in FIG. 18, that includes, or is configured to access, one or more computer-accessible media. In the illustrated example, the computer system 1800 includes one or more processors 1810 coupled to a system memory 1820 via an input/output (I/O) interface 1830. The computer system 1800 further includes a network interface 1840 coupled to the I/O interface 1830. While FIG. 18 shows the computer system 1800 as a single computing device, in various examples the computer system 1800 can include one computing device or any number of computing devices configured to work together as a single computer system 1800.

In various examples, the computer system 1800 can be a uniprocessor system including one processor 1810, or a multiprocessor system including several processors 1810 (e.g., two, four, eight, or another suitable number). The processor(s) 1810 can be any suitable processor(s) capable of executing instructions. For example, in various examples, the processor(s) 1810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1810 can commonly, but not necessarily, implement the same ISA.

The system memory 1820 can store instructions and data accessible by the processor(s) 1810. In various examples, the system memory 1820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1820 as database service or control plane or client-side driver code 1825 (e.g., executable to implement, in whole or in part, the database service 110 and/or control plane 512 and/or client-side driver 130) and data 1826.

In some examples, the I/O interface 1830 can be configured to coordinate I/O traffic between the processor 1810, the system memory 1820, and any peripheral devices in the device, including the network interface 1840 and/or other peripheral interfaces (not shown). In some examples, the I/O interface 1830 can perform any necessary protocol, timing, or other data transformations to convert data signals from one component (e.g., the system memory 1820) into a format suitable for use by another component (e.g., the processor 1810). In some examples, the I/O interface 1830 can include support for devices attached through various types of peripheral buses, such as a variant of the Peripheral Component Interconnect (PCI) bus standard or the Universal Serial Bus (USB) standard, for example. In some examples, the function of the I/O interface 1830 can be split into two or more separate components, such as a north bridge and a south bridge, for example. Also, in some examples, some or all of the functionality of the I/O interface 1830, such as an interface to the system memory 1820, can be incorporated directly into the processor 1810.

The network interface 1840 can be configured to allow data to be exchanged between the computer system 1800 and other devices 1860 attached to a network or networks 1850, such as other computer systems or devices as illustrated in FIG. 1, for example. In various examples, the network interface 1840 can support communication via any suitable wired or wireless general data networks, such as types of Ethernet network, for example. Additionally, the network interface 1840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1800 includes one or more offload cards 1870A or 1870B (including one or more processors 1875, and possibly including the one or more network interfaces 1840) that are connected using the I/O interface 1830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1800 can act as a host electronic device (e.g., operating as part of a hardware virtualization service) that hosts compute resources such as compute instances, and the one or more offload cards 1870A or 1870B execute a virtualization manager that can manage compute instances that execute on the host electronic device. As an example, in some examples the offload card(s) 1870A or 1870B can perform compute instance management operations, such as pausing and/or un-pausing compute instances, launching and/or terminating compute instances, performing memory transfer/copying operations, etc. These management operations can, in some examples, be performed by the offload card(s) 1870A or 1870B in coordination with a hypervisor (e.g., upon a request from a hypervisor) that is executed by the other processors 1810A-1810N of the computer system 1800. However, in some examples the virtualization manager implemented by the offload card(s) 1870A or 1870B can accommodate requests from other entities (e.g., from compute instances themselves), and can not coordinate with (or service) any separate hypervisor.

In some examples, the system memory 1820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1800 via the I/O interface 1830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1800 as the system memory 1820 or another type of memory. Further, a computer-accessible medium can include transmission media or signals such as electrical, electromagnetic, or digital signals, conveyed via a communication medium such as a network and/or a wireless link, such as can be implemented via the network interface 1840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1718A-1718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   detecting a failure associated with a database implemented by a database service in a multi-tenant cloud provider network, the database service including a first electronic device implementing a table volume that stores and/or indexes logical change data of the database, the logical change data pertaining to committed updates that occurred between a time of the failure and a restored time, and a second electronic device implementing a page volume that stores page change data for database pages of the database used by a database engine implemented by a third electronic device of the database service;
   determining to recover the database;
   obtaining, by a control plane of the database service via use of a first data structure in the table volume of the first electronic device, transactional metadata for one or more transactions that were committed into a last file of multiple files storing the logical change data of the database in a second data structure of the table volume of the first electronic device;
   verifying whether data for the one or more transactions was durably written to the page volume implemented by the second electronic device;
   obtaining the logical change data, from the second data structure of the table volume of the first electronic device, for one of the one or more transactions determined to not have been durably written to the page volume of the second electronic device; and
   sending one or more commands to the database engine, based at least in part on the logical change data, to cause the database engine to replay at least the one transaction to update the page volume.

2. The computer-implemented method of claim 1, wherein the logical change data stored in the second data structure comprises changelog records, and wherein the page change data stored by the page volume includes redo log records.

3. The computer-implemented method of claim 1, wherein the obtaining of the transactional metadata includes collecting transactional metadata for only those transactions, of the transactions committed into the last file, that are not marked as being durably committed within the first data structure of the table volume, and wherein the first data structure comprises a transaction table.

4. A computer-implemented method performed by a database service including a first electronic device implementing a table volume that stores and/or indexes logical change data of a database, and a second electronic device implementing a page volume that stores page change data for database pages of the database used by a database engine implemented by a third electronic device of the database service, the method comprising:
   detecting a failure associated with the database;
   obtaining, via the table volume of the database implemented by the first electronic device, transactional metadata for one or more transactions that were committed into a last file of multiple files storing the logical change data of the database, the logical change data pertaining to committed updates that occurred between a time of the failure and a restored time;
   verifying whether data for the one or more transactions was durably written to the page volume implemented by the second electronic device;
   obtaining the logical change data, from the table volume of the first electronic device, for one of the one or more transactions determined to not have been durably written to the page volume of the second electronic device; and
   sending one or more commands, based at least in part on the logical change data, to cause at least the one transaction to be replayed to update the page volume of the second electronic device.

5. The computer-implemented method of claim 4, wherein the obtaining of the transactional metadata includes collecting transactional metadata for all transactions that were committed into the last file.

6. The computer-implemented method of claim 4, wherein the obtaining of the transactional metadata includes collecting transactional metadata for only those transactions, of the transactions committed into the last file, that are not marked as being durably committed within a transaction table of the table volume.

7. The computer-implemented method of claim 4, wherein:
   the obtained transactional metadata does not include actual logical change data associated with the one or more transactions;
   the obtained transactional metadata is stored in a first data structure of the table volume; and
   the actual logical change data associated with the one or more transactions is stored in a second data structure of the table volume.

8. The computer-implemented method of claim 4, wherein the obtaining of the transactional metadata, the verifying, the obtaining of the logical change data, and the replay of at least the one transaction to update the page volume occurs in an amount of time, the amount of time being less than ten seconds.

9. The computer-implemented method of claim 8, wherein the amount of time is less than one second.

10. The computer-implemented method of claim 4, wherein the database is implemented by the database service in a multi-tenant cloud provider network, and wherein the database service is communicatively coupled to the table volume and the database page volume via one or more network connections.

11. The computer-implemented method of claim 4, wherein the page change data stored by the page volume includes redo log records, and wherein the page volume further stores database pages.

12. The computer-implemented method of claim 11, wherein the logical change data stored by the table volume includes changelog records.

13. The computer-implemented method of claim 4, wherein a size of the obtained transactional metadata is less than ten percent of a size of a corresponding one of the multiple files, and wherein the multiple files storing the logical change data of the database are binlog files.

14. The computer-implemented method of claim 4, wherein the transactional metadata, for at least one transaction of the one or more transactions, includes a commit time of the at least one transaction, a transaction identifier of the at least one transaction, or a log sequence number (LSN) associated with the table volume.

15. A system implemented as code executing on one or more processors, the system comprising:
   a first one or more electronic devices to implement a table volume that stores and/or indexes logical change data of a database of a database service, the logical change data pertaining to committed updates that occurred between a time of the failure and a restored time;

a second one or more electronic devices to implement a page volume that stores page change data for database pages of the database;

a third one or more electronic devices to implement a database engine of the database service, the database engine to utilize at least the page volume and the table volume; and a fourth one or more electronic devices to implement a control plane of the database service, the control plane including instructions that upon execution cause the control plane to:

detect a failure associated with the database;

obtain, via the table volume of the database implemented by the first electronic device, transactional metadata for one or more transactions that were committed into a last file of multiple files storing the logical change data of the database, the logical change data pertaining to committed updates that occurred between a time of the failure and a restored time;

verify whether data for the one or more transactions was durably written to the page volume implemented by the second electronic device;

obtain the logical change data, from the table volume of the first electronic device, for one of the one or more transactions determined to not have been durably written to the page volume of the second electronic device; and send one or more commands, based at least in part on the logical change data, to cause at least the one transaction to be replayed to update the page volume of the second electronic device.

16. The system of claim 15, wherein the obtaining of the transactional metadata includes collecting transactional metadata for all transactions that were committed into the last file.

17. The system of claim 15, wherein the obtaining of the transactional metadata includes collecting transactional metadata for only transactions, of the transactions committed into the last file, that are not marked as being durably committed within a transaction table of the table volume.

18. The system of claim 15, wherein:

the obtained transactional metadata does not include actual logical change data associated with the one or more transactions;

the obtained transactional metadata is stored in a first data structure of the table volume; and the actual logical change data associated with the one or more transactions is stored in a second data structure of the table volume.

19. The system of claim 15, wherein the obtaining of the transactional metadata, the verification, the obtaining the logical change data, and the replay, all occur in an amount of time, the amount of time being less than ten seconds.

20. The system of claim 15, wherein the page change data stored by the page volume includes redo log records, wherein the page volume further stores database pages, and wherein the logical change data stored by the table volume includes changelog records.

* * * * *